(12) United States Patent
Horigane

(10) Patent No.: US 11,934,709 B2
(45) Date of Patent: Mar. 19, 2024

(54) INFORMATION PROCESSING APPARATUS AND INFORMATION PROCESSING SYSTEM FOR TRANSMITTING DATA TO TARGET INFORMATION TERMINAL

(71) Applicant: FUJIFILM BUSINESS INNOVATION CORP., Tokyo (JP)

(72) Inventor: Ryuichi Horigane, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 414 days.

(21) Appl. No.: 17/163,937

(22) Filed: Feb. 1, 2021

(65) Prior Publication Data
US 2022/0050643 A1    Feb. 17, 2022

(30) Foreign Application Priority Data
Aug. 12, 2020   (JP) .................................. 2020-136242

(51) Int. Cl.
    G06F 3/12    (2006.01)
(52) U.S. Cl.
    CPC .......... *G06F 3/1208* (2013.01); *G06F 3/1256* (2013.01); *G06F 3/1267* (2013.01); *G06F 3/1288* (2013.01)
(58) Field of Classification Search
    None
    See application file for complete search history.

(56) References Cited

U.S. PATENT DOCUMENTS

| 10,834,275 | B2 | 11/2020 | Tsukada |
| 2017/0031638 | A1* | 2/2017 | Kitagata ............... G06F 3/1206 |
| 2017/0228198 | A1* | 8/2017 | Koormamtharayil ....................... G06F 3/1292 |

FOREIGN PATENT DOCUMENTS

| JP | 2009-157556 A | 7/2009 |
| JP | 2014-085728 A | 5/2014 |
| JP | 2019-006013 A | 1/2019 |
| JP | 2019-050529 A | 3/2019 |

\* cited by examiner

*Primary Examiner* — Lennin R RodriguezGonzalez
*Assistant Examiner* — Lennin R Rodriguez
(74) *Attorney, Agent, or Firm* — Oliff PLC

(57) ABSTRACT

An information processing apparatus includes a processor configured to receive, from an external apparatus, a request to output a file to be output by an information terminal, identify, in cooperation with the external apparatus, an information terminal that satisfies a predetermined condition among plural information terminals that are candidates for a target to which the file is to be output, and transmit, to the identified information terminal, first information to be used to identify a location at which the file is stored before a user requests the identified information terminal to display information regarding the file.

16 Claims, 22 Drawing Sheets

| INFORMATION FOR IDENTIFYING IMAGE FORMING APPARATUS | REGISTRATION AS PRIORITY APPARATUS | USE HISTORY |
|---|---|---|
| Mfd1234.AAA.co.jp | ✓ | |
| 129.249.85.100 | ✓ | |
| Mfd123.AAA.co.jp | ✓ | |
| 129.249.85.101 | ✗ | |
| 129.249.85.103 | ✗ | |
| | | |

✓ : PRIORITY APPARATUS
✗ : NON-PRIORITY APPARATUS

| INFORMATION FOR IDENTIFYING USER | INFORMATION FOR IDENTIFYING LOCATION OF DOCUMENT FILE | DISPLAY NAME |
|---|---|---|
| Taro.yamada@AAA.co.jp | https://x.y.com/z1/doc1 | NOTEPAD |
| Taro.yamada@AAA.co.jp | https://a.b.com/c2/doc2 | REPORT |
| Hanako.Yokohama@AAA.co.jp | https://x.y.com/z3/doc3 | WEEKLY REPORT |

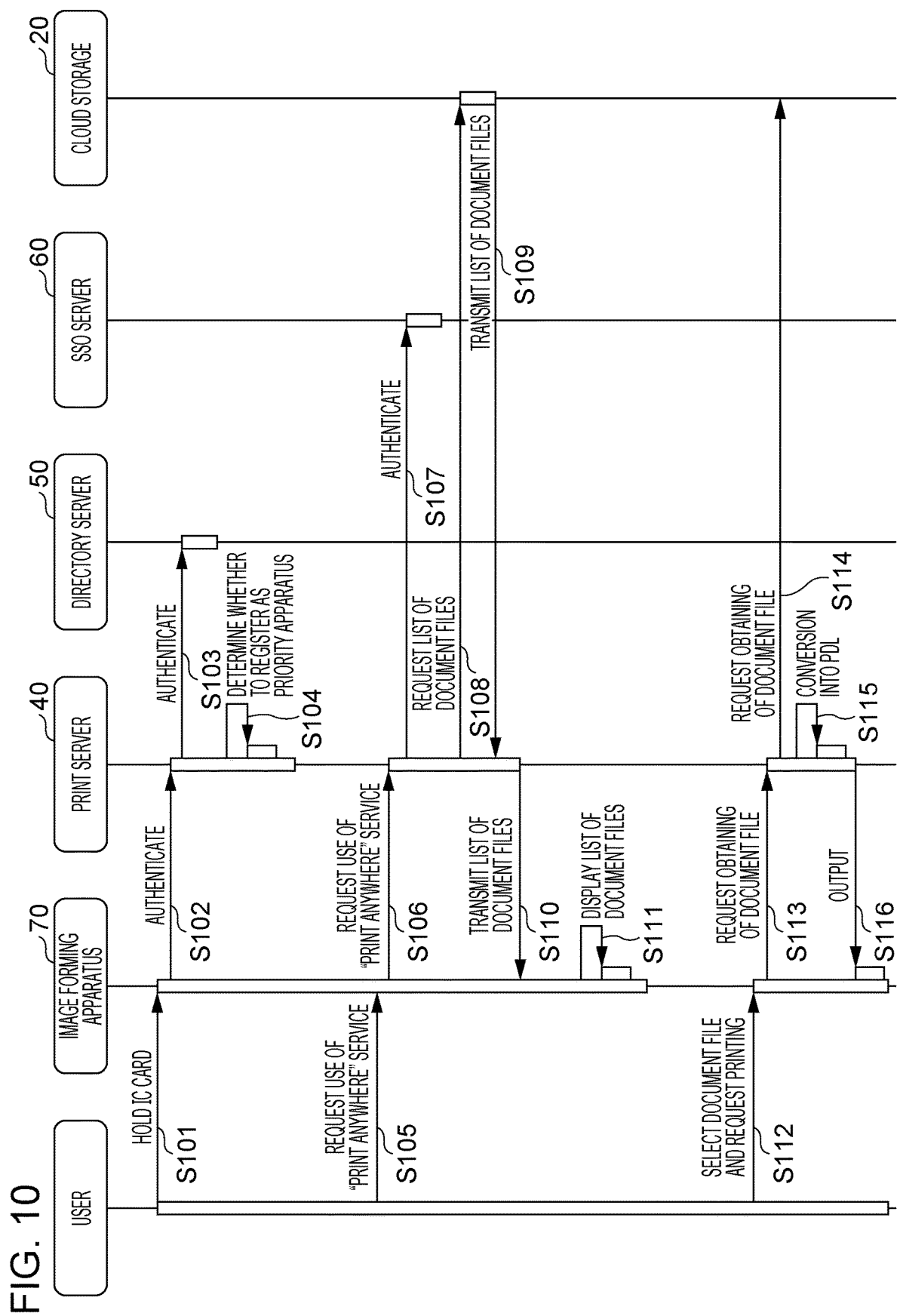

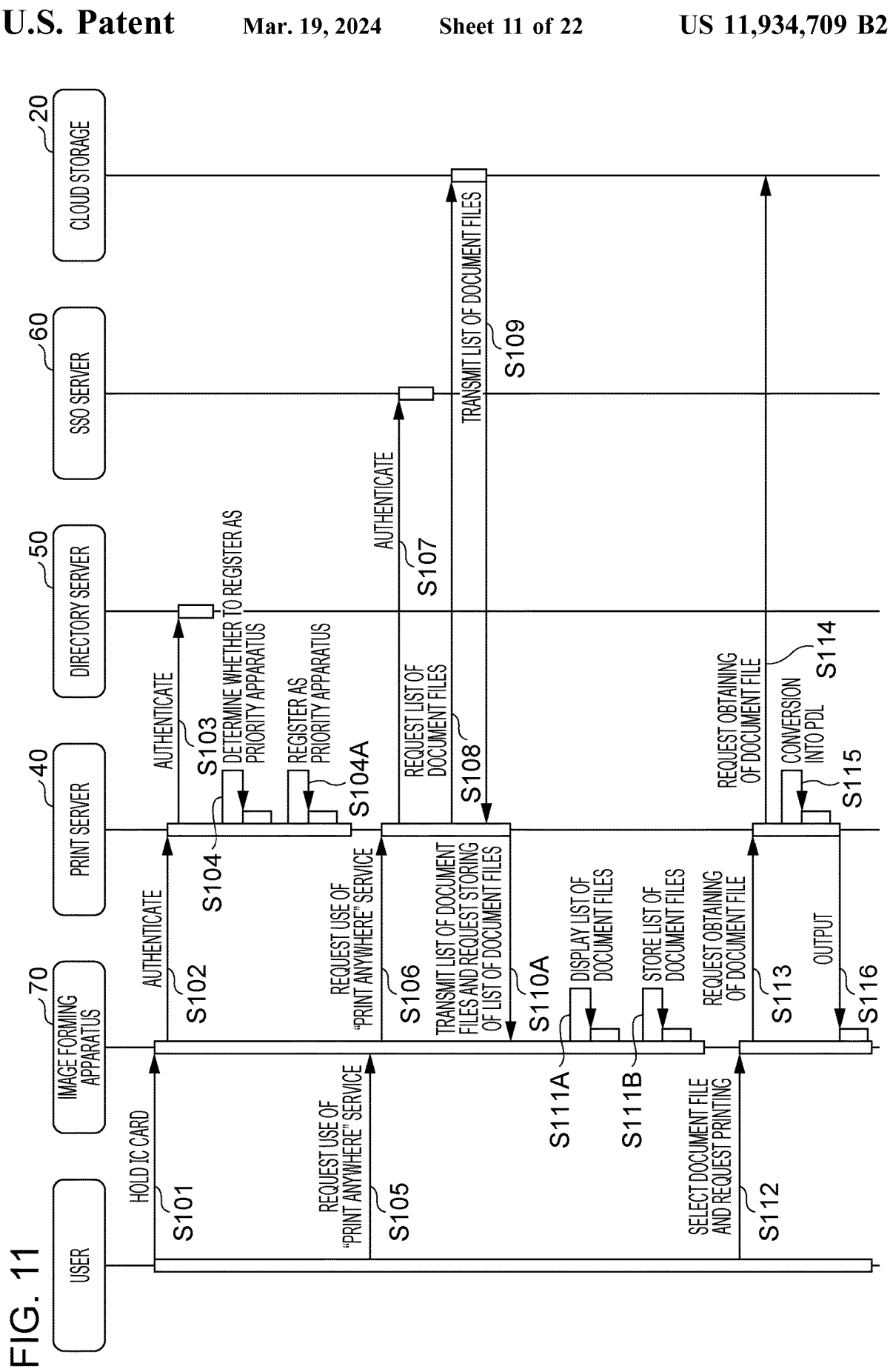

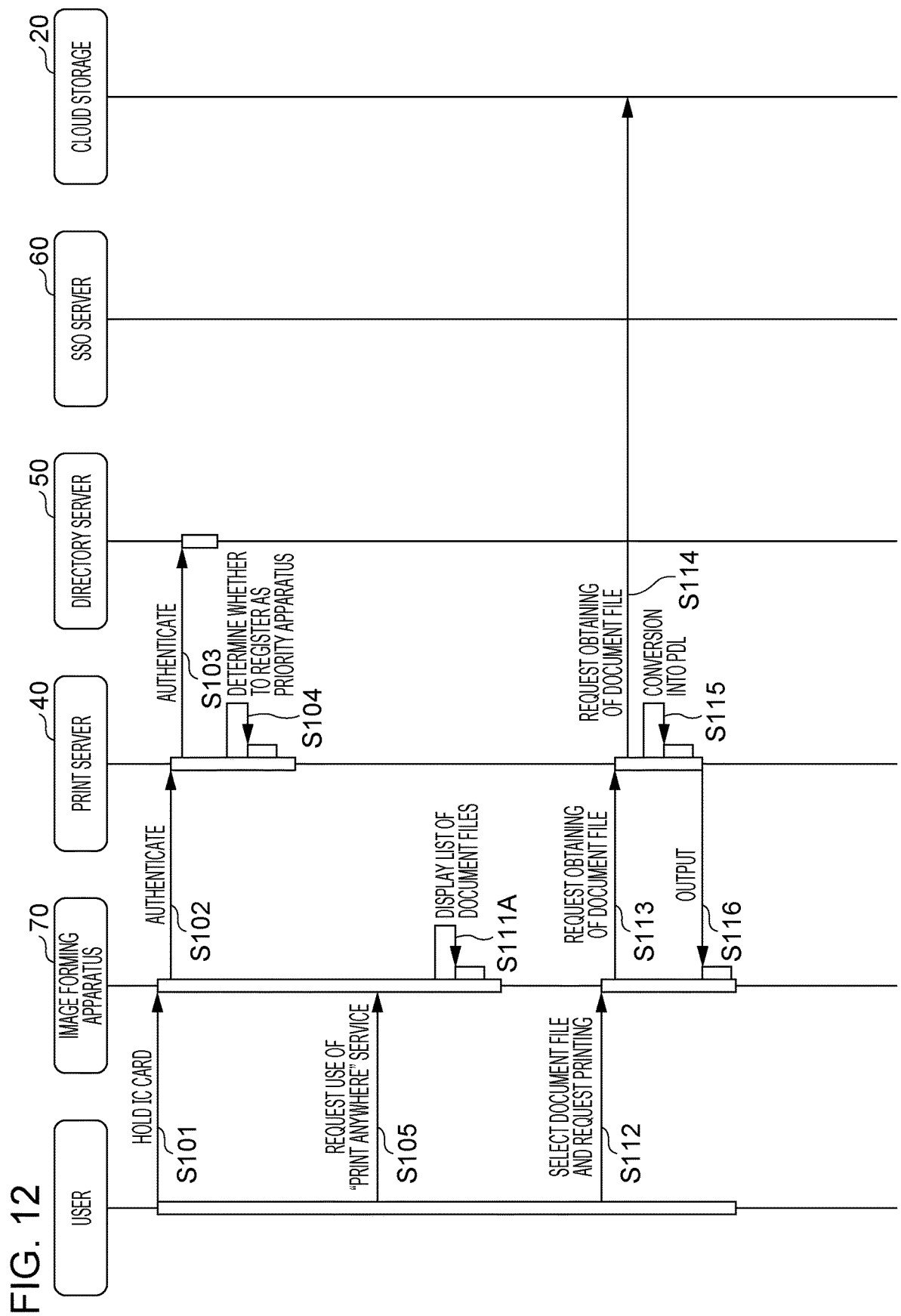

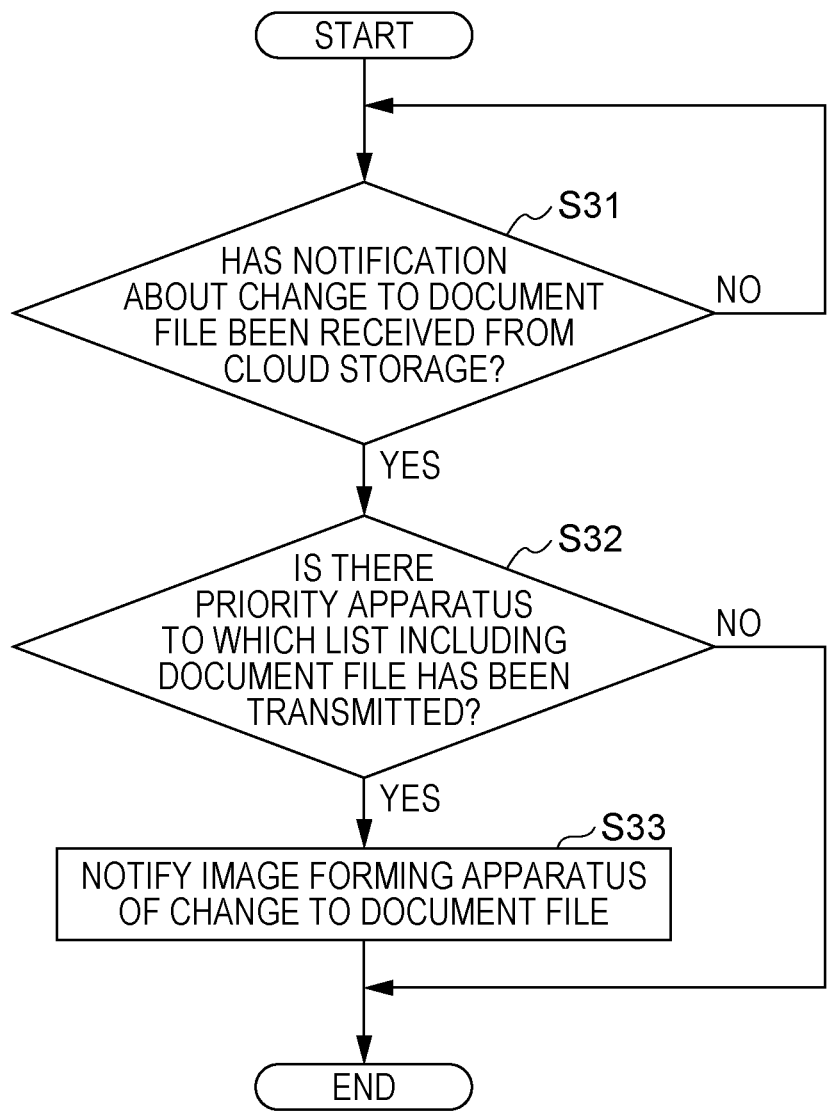

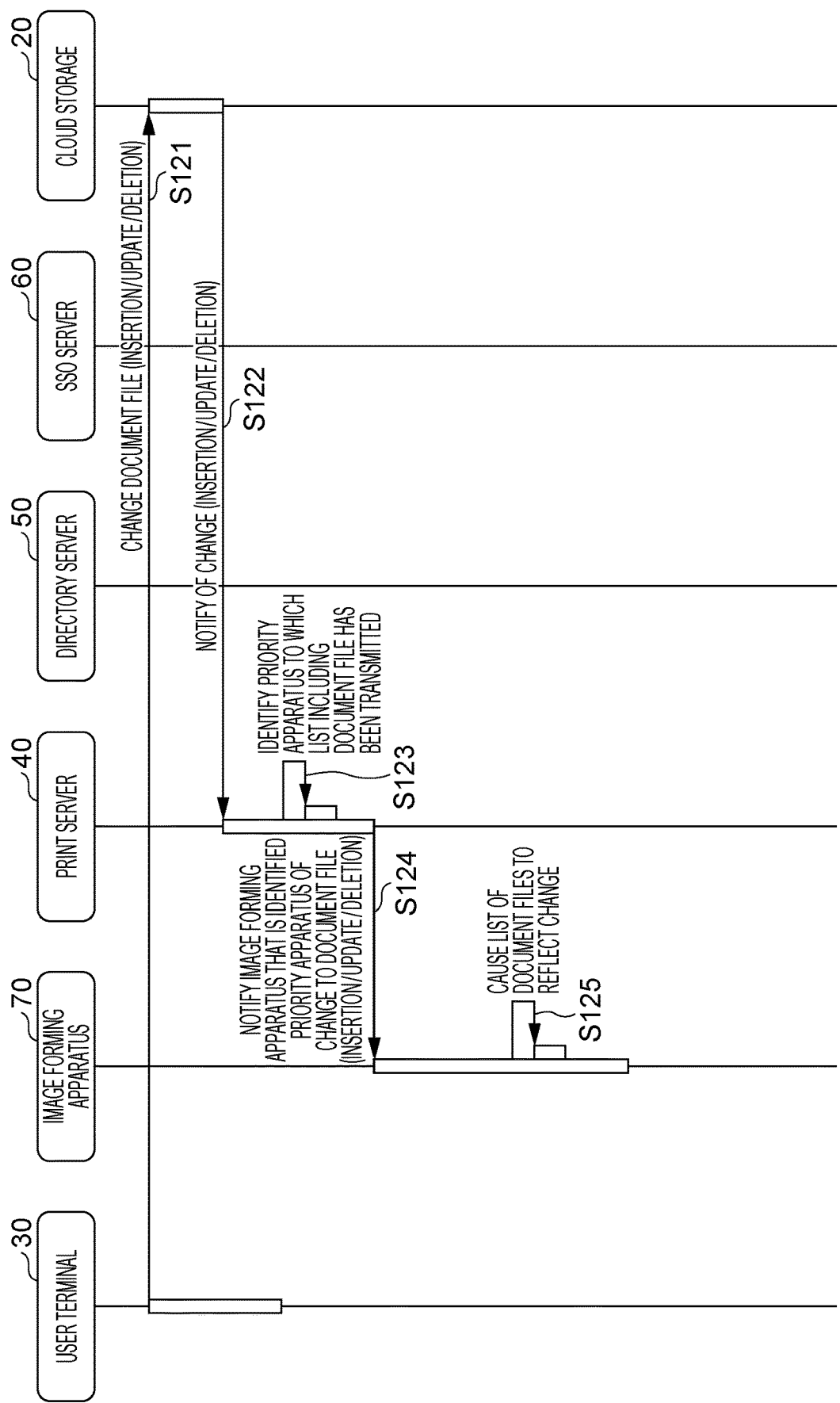

| INFORMATION FOR IDENTIFYING USER | INFORMATION FOR IDENTIFYING LOCATION OF DOCUMENT FILE | DISPLAY NAME |
|---|---|---|
|  |  |  |
|  |  |  |

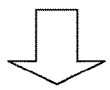

| INFORMATION FOR IDENTIFYING USER | INFORMATION FOR IDENTIFYING LOCATION OF DOCUMENT FILE | DISPLAY NAME |
|---|---|---|
| Taro.yamada@AAA.co.jp | Mfd1234.AAA.co.jp | NOTEPAD |
|  |  |  |

| INFORMATION FOR IDENTIFYING USER | INFORMATION FOR IDENTIFYING LOCATION OF DOCUMENT FILE | DISPLAY NAME |
|---|---|---|
| Taro.yamada@AAA.co.jp | Mfd1234.AAA.co.jp | NOTEPAD ⇒ NOTEPAD2 |
|  |  |  |
|  |  |  |

| INFORMATION FOR IDENTIFYING USER | INFORMATION FOR IDENTIFYING LOCATION OF DOCUMENT FILE | DISPLAY NAME |
|---|---|---|
| ~~Taro.yamada@AAA.co.jp~~ | ~~Mfd1234.AAA.co.jp~~ | ~~NOTEPAD~~ |
|  |  |  |
|  |  |  |

| INFORMATION FOR IDENTIFYING USER | INFORMATION FOR IDENTIFYING IMAGE FORMING APPARATUS | REGISTRATION AS PRIORITY APPARATUS | USE HISTORY |
|---|---|---|---|
| Taro.yamada@AAA.co.jp | Mfd1234.AAA.co.jp | ✓ | |
| Taro.yamada@AAA.co.jp | 129.249.85.100 | ✗ | |
| Hanako.yokohama@AAA.co.jp | Mfd123.AAA.co.jp | ✓ | |
| Hanako.yokohama@AAA.co.jp | Mfd1234.AAA.co.jp | ✗ | |
| | | | |

✓ : PRIORITY APPARATUS
✗ : NON-PRIORITY APPARATUS

INFORMATION PROCESSING APPARATUS AND INFORMATION PROCESSING SYSTEM FOR TRANSMITTING DATA TO TARGET INFORMATION TERMINAL

CROSS-REFERENCE TO RELATED APPLICATIONS

This application is based on and claims priority under 35 USC 119 from Japanese Patent Application No. 2020-136242 filed Aug. 12, 2020.

BACKGROUND

(i) Technical Field

The present disclosure relates to an information processing apparatus and an information processing system.

(ii) Related Art

A service is known that enables a user to read a file stored in a storage, a server, or the like (hereinafter referred to as a "storage or the like") connected to a cloud network or the like and output a print of the read file using a printing apparatus operated by the user. When the user selects use of the service, the printing apparatus notifies a server that provides the service of the selection, and the server obtains a list of files from the storage or the like and provides the list for the printing apparatus. The user identifies a file to be printed on the list displayed on an operation unit of the printing apparatus and requests printing of the identified file (e.g., refer to Japanese Unexamined Patent Application Publication No. 2019-006013).

SUMMARY

In order to obtain information necessary to identify a file, however, communication from the printing apparatus to the server, communication from the server to the storage or the like, communication from the storage or the like to the server, and communication from the server to the printing apparatus need to be performed in a hierarchical structure. Since communication needs to be performed plural times in order to reach a target file, waiting time is long.

Aspects of non-limiting embodiments of the present disclosure relate to, in a case where an information terminal operated by a user uses a file stored in an external system, reduction in time taken to display information to be used to identify a location at which the file is stored, compared to when information for identifying the location at which the file is stored is obtained from the external system and displayed every time the user requests the information terminal to display the file.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive, from an external apparatus, a request to output a file to be output by an information terminal, identify, in cooperation with the external apparatus, an information terminal that satisfies a predetermined condition among a plurality of information terminals that are candidates for a target to which the file is to be output, and transmit, to the identified information terminal, first information to be used to identify a location at which the file is stored before a user requests the identified information terminal to display information regarding the file.

BRIEF DESCRIPTION OF THE DRAWINGS

Exemplary embodiments of the present disclosure will be described in detail based on the following figures, wherein:

FIG. 3 is a diagram illustrating an example of a priority apparatus management table used in the first exemplary embodiment;

FIG. 5 is a diagram illustrating an example of a list of document files;

FIG. 10 is a diagram illustrating an example of a processing sequence at a time when an image forming apparatus that has not been registered as a priority apparatus uses a "Print Anywhere" service;

FIG. 11 is a diagram illustrating an example of a processing sequence at a time when an image forming apparatus newly registered as a priority apparatus uses the "Print Anywhere" service;

FIG. 12 is a diagram illustrating an example of a processing sequence at a time when an image forming apparatus that has already been registered as a priority apparatus uses the "Print Anywhere" service;

FIG. 13 is a flowchart illustrating an example of a process performed by a print server (refer to FIG. 1) used in a second exemplary embodiment;

FIG. 14 is a diagram illustrating an example of a processing sequence used when a list of document files reflects a change to a document file;

FIGS. 15A to 15C are diagrams illustrating examples in which a list of document files stored in an image forming apparatus is changed: FIG. 15A illustrates an example in which a document file is inserted, FIG. 15B illustrates an example in which a document file is updated, and FIG. 15C illustrates an example in which a document file is deleted;

FIG. 16 is a diagram illustrating an example of a priority apparatus management table used in a third exemplary embodiment;

DETAILED DESCRIPTION

Exemplary embodiments will be described in detail hereinafter with reference to the accompanying drawings.
First Exemplary Embodiment
System Configuration FIG. 1 is a diagram illustrating an example of the configuration of a network system 1 used in a service that enables a user to obtain a document file in a cloud storage and print the document file using one of image forming apparatuses 70.

This service is also called a "Print Anywhere" service. The document file is an example of a file.

The network system 1 according to the present exemplary embodiment is an example of an information processing system.

Figure 1:
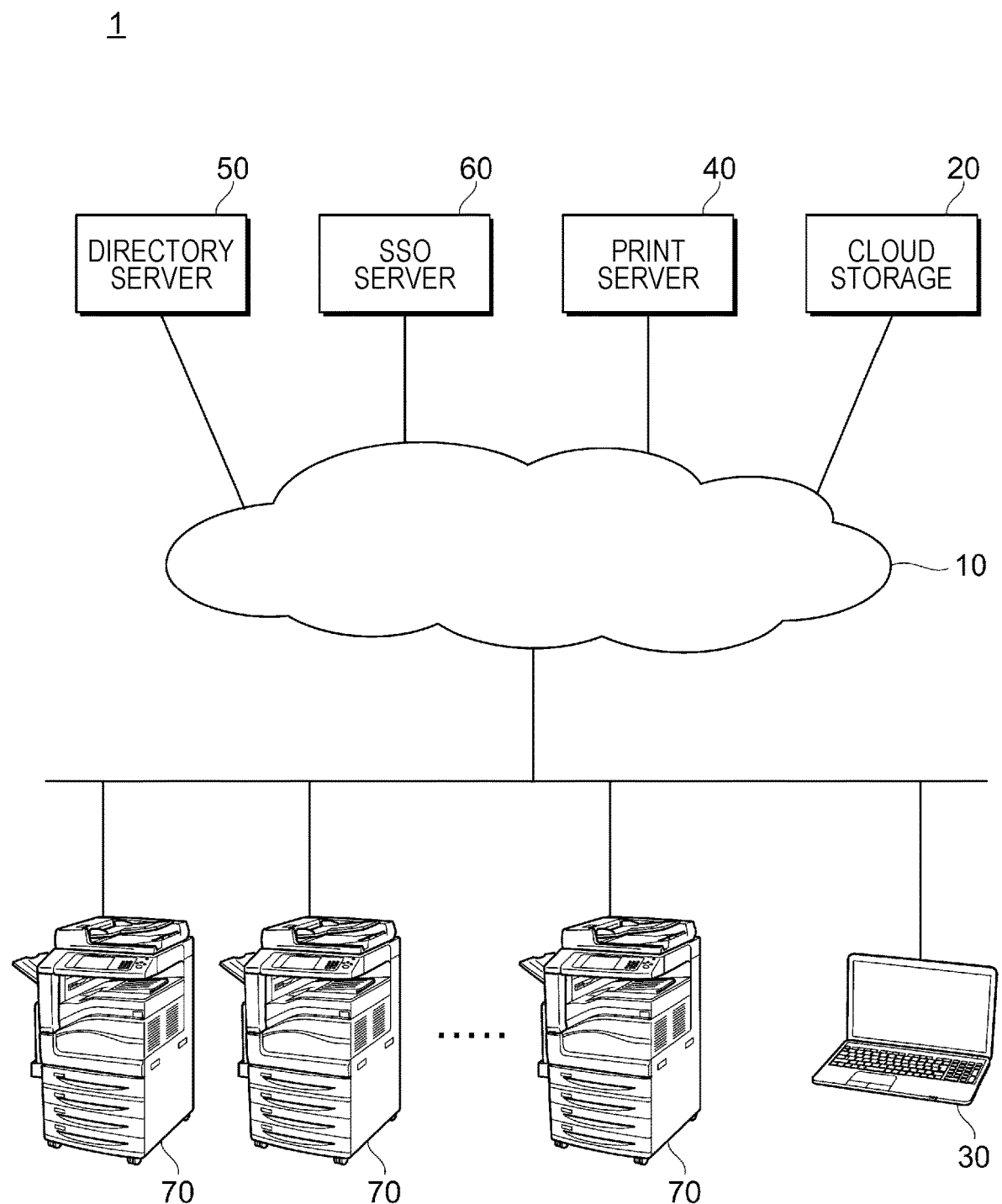
FIG. 1 is a diagram illustrating an example of the configuration of a network system used in a service that enables a user to obtain a document file in a cloud storage from one of image forming apparatuses and print the document file.

The network system 1 illustrated in FIG. 1 includes a cloud storage 20, a user terminal 30, a print server 40, a directory server 50, a single sign-on (SSO) server 60, and the plural image forming apparatuses 70 connected to a cloud network 10.

Although FIG. 1 illustrates only one cloud storage 20 and only one user terminal 30, plural cloud storages 20 and plural user terminals 30 may be provided physically, instead.

The cloud network 10 is not limited to a wired network and may be a wireless network, instead. The cloud network 10 may be a combination of a wired network and a wireless network.

Although the user terminal 30 and the image forming apparatuses 70 are connected to the cloud network 10 over a local area network (LAN) in FIG. 1, some or all of the user terminal 30 and the image forming apparatuses 70 may be directly connected to the cloud network 10.

The cloud storage 20 stores document files. Each of the document files in the present exemplary embodiment is a data file generated using a computer and includes, for example, text, figures, and/or images. The images include still images and moving images indicated by image data obtained by a camera or an image sensor, for example, or image data for facsimile.

The document files used in the present exemplary embodiment, however, are not limited to data files used for certain purposes or in certain fields. For example, the document files are not limited to data files used in an office.

The cloud storage 20 according to the present exemplary embodiment is provided with a synchronous application programming interface (API) used to obtain a list of document files, a synchronous API used to obtain actual data of a document file, and an asynchronous API used to notify the user of changes to the document files.

The changes to the document files include insertion, update, and deletion.

A list of document files is used when the user who operates one of the image forming apparatuses 70 selects a document file to be printed.

A list of document files includes information for identifying users relating to the document files, information for identifying locations of the document files, and display names of the document files. The list of document files is an example of first information.

The user terminal 30 is a computer used by the user who uses the "Print Anywhere" service to control the document files in the cloud storage 20. More specifically, the user terminal 30 is used to insert a document file into the cloud storage 20, update a document file stored in the cloud storage 20, and delete a document file stored in the cloud storage 20.

Although FIG. 1 illustrates a laptop computer as the user terminal 30, the user terminal 30 may be, for example, a desktop computer, a tablet computer, or a smartphone, instead. The user terminal 30 is an example of an external apparatus.

The print server 40 mediates communication between the cloud storage 20 and the image forming apparatuses 70 and enables the user to obtain, from the cloud storage 20, a document file specified from one of the image forming apparatuses 70 and print the document file.

The print server 40 has a function of obtaining a list of document files or actual data of a document file from the cloud storage 20 and transmitting the list or the actual data to one of the image forming apparatuses 70 using one of the above-mentioned synchronous APIs. The print server 40 has a function of converting a data format of the obtained actual data of a document file into one in which the image forming apparatus 70 can print the document file and outputting the actual data. The actual data output to the image forming apparatus 70 is described in a page description language (PDL).

The print server 40 has a function of detecting a change to the document files stored in the cloud storage 20 using the above-mentioned asynchronous API. With this detecting function, the print server 40 detects states of the document files stored in the cloud storage 20 in near real-time.

The print server 40 also has a function of managing certain image forming apparatuses 70 that satisfy a predetermined condition as priority apparatuses.

In the present exemplary embodiment, whether to manage each of the image forming apparatuses 70 as a priority apparatus is determined using the same criterion for every image forming apparatus 70. Alternatively, different conditions may be used for each of groups of one or more image forming apparatuses 70.

The predetermined condition provides a criterion for determining a use state of the "Print Anywhere" service. In the present exemplary embodiment, the predetermined condition is satisfied when the number of uses or a use frequency within a predetermined period is higher than a threshold and is not satisfied when the number of uses or a use frequency within a predetermined period is lower than or equal to the threshold. In the present exemplary embodiment, the number of uses and use frequencies are calculated without distinguishing users who use the image forming apparatuses 70 from one another.

In the present exemplary embodiment, the print server 40 transmits a list of document files indicating storage locations of the document files to image forming apparatuses 70 that can use the "Print Anywhere" service and that have been registered as priority apparatuses and causes the image forming apparatuses 70 to store the list. That is, the print server 40 transmits the list of document files to the image forming apparatuses 70 that are priority apparatuses before users who use the "Print Anywhere" service give an instruction to display the list of document files. As a result, the image forming apparatuses 70 registered as priority apparatuses need not obtain the list of document files each time the image forming apparatuses 70 use the "Print Anywhere" service, thereby reducing time taken to display the list of document files.

The print server 40 according to the present exemplary embodiment, however, determines whether an image forming apparatus 70 from which a request to use the "Print Anywhere" service has been received satisfies the condition of a priority apparatus when the print server 40 receives a notification from the image forming apparatus 70.

The print server 40, therefore, still needs to obtain a list of document files and transmit the list to an image forming apparatus 70 that uses the "Print Anywhere" service when the image forming apparatus 70 is registered as a priority apparatus. In second and later uses, however, the print server 40 need not obtain the list of document files in accordance with a user operation.

The list of document files is an example of first information. The print server 40 is an example of an information processing apparatus.

The print server 40 also has a function of keeping up to date a list of document files stored in each image forming apparatus 70 registered as a priority apparatus. When a document file stored in the cloud storage 20 is changed, for example, the print server 40 notifies each image forming apparatus 70 registered as a priority apparatus of the change in real-time. As a result, the list of document files stored in each image forming apparatus 70 is synchronized with that stored in the cloud storage 20. Even if there is a request to use the "Print Anywhere" service, therefore, the list of document files is not newly obtained. In other words, the transmission of the list of document files that accompanies the synchronization is performed before users give an instruction to display the list of document files. "Before users give an instruction to display the list of document files" in this case can be before the users log in or before the users give the instruction to display the list of document files.

The print server 40 according to the present exemplary embodiment also manages cancellation of registration as priority apparatuses. In the case of the cancellation of registration as priority apparatuses, too, the same criterion is used for all the image forming apparatuses 70. The criterion used for a determination as to the cancellation is different from that used for the determination as to the registration.

The print server 40 transmits the list of document files to the image forming apparatuses 70 that are not priority apparatuses only while the image forming apparatuses 70 are using the "Print Anywhere" service and does not cause the image forming apparatuses 70 to store the list. In other words, the list of document files is deleted from the image forming apparatuses 70 once the image forming apparatuses 70 finish using the "Print Anywhere" service.

As a result, the image forming apparatus 70 that are not registered as a priority apparatus need time to obtain the list of document files from the cloud storage 20 each time the image forming apparatuses 70 use the "Print Anywhere" service. This is a difference from the image forming apparatuses 70 registered as priority apparatuses.

The directory server 50 manages permissions given to the user terminal 30 and singlehandedly controls an authentication process performed between the user terminal 30 and the print server 40.

The SSO server 60 achieves use of plural services through a single authentication process and opens access to the cloud storage 20.

The image forming apparatuses 70 each receive a request to use the "Print Anywhere" service from a user, obtain a list of document files from the print server 40, present the list to the users, and print a document file selected by the user. The image forming apparatuses 70 used in the present exemplary embodiment, however, have functions other than printing.

For example, the image forming apparatuses 70 have a function of requesting the print server 40 to authenticate the user and a function of storing a list of document files obtained from the print server 40.

With these functions, each of the image forming apparatuses 70 according to the present exemplary embodiment can, each time the image forming apparatus 70 receives a request to use the "Print Anywhere" service from a user, read a list of document files stored therein and present the list to the user without accessing the cloud storage 20. Since communication with the cloud storage 20 via the print server 40 is omitted, a period of time for which the user needs to wait until the list of document files is displayed is reduced.

Each of the image forming apparatuses 70, however, also has a function of, if a presented list of document files includes a document file selected by the user, requesting the print server 40 to obtain the document file.

In this case, communication for obtaining a new list of document files is needed, and the user needs to wait until the new list of document files is displayed such that the existing list of document files reflects the new list of document files.

The new list of document files, however, can be expressed as differential information, and time taken to complete the communication is shorter than when the entirety of a list of document files is obtained at once.

Each of the image forming apparatuses 70 also has a function of, when receiving a notification about a change in a list of document files from the print server 40, causing a list of document files stored therein to reflect the change and keeping the list of document files stored therein consistent with the list of document files stored in the cloud storage 20. The image forming apparatuses 70 according to the present exemplary embodiment are examples of an information terminal.

Configuration of Apparatuses Included in System

The configuration of some of the apparatuses included in the network system 1 will be described in more detail hereinafter.

Configuration of Print Server

Figure 2:
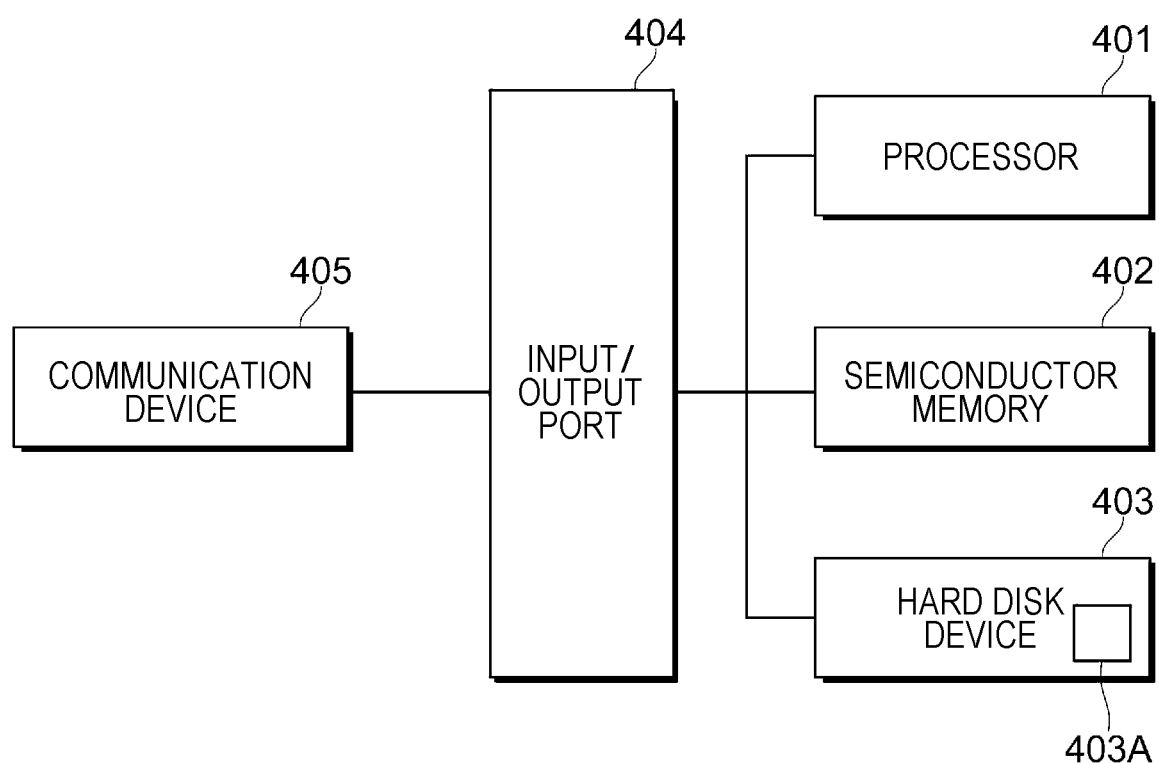
FIG. 2 is a diagram illustrating an example of the configuration of a print server used in a first exemplary embodiment.

FIG. 2 is a diagram illustrating an example of the configuration of the print server 40 used in the first exemplary embodiment.

The print server 40 illustrated in FIG. 2 includes a processor 401 that controls the entirety thereof by executing a program, a semiconductor memory 402 that constitutes a computer along with the processor 401, a hard disk device 403 storing the program and data necessary for management, an input/output port 404, and a communication device 405 that achieves communication with the outside. These components are connected to one another by a bus and various signal lines.

The processor 401 is an example of a second processor.

The semiconductor memory 402 includes a read-only memory (ROM) storing basic input/output system (BIOS)

and the like and a random-access memory (RAM) used as a working area. The RAM is a storage device.

The hard disk device 403 is an auxiliary storage device that uses a magnetic disk as a storage medium. Alternatively, a semiconductor memory may be used for the auxiliary storage device, too.

In the present exemplary embodiment, the hard disk device 403 stores a table 403A for managing priority apparatuses (hereinafter also referred to as a "priority apparatus management table 403A").

FIG. 3 is a diagram illustrating an example of the priority apparatus management table 403A used in the first exemplary embodiment. In the present exemplary embodiment, a combination of information indicating whether an image forming apparatus 70 that can use the "Print Anywhere" service has been registered as a priority apparatus and information regarding a use history is stored in the priority apparatus management table 403A while being associated with information for identifying the image forming apparatus 70 (refer to FIG. 1).

The information for identifying an image forming apparatus 70 registered as a priority apparatus is, for example, a mail address, an Internet protocol (IP) address, a media access control (MAC) address, a device name, or the like.

In the present exemplary embodiment, five image forming apparatuses 70 can use the "Print Anywhere" service.

In the present exemplary embodiment, users are not involved in the registration as priority apparatuses. The information for identifying the users, therefore, is not associated with the information stored in the priority apparatus management table 403A illustrated in FIG. 3.

If a use history satisfies a predetermined condition, a check is given for the information indicating whether an image forming apparatus 70 has been registered as a priority apparatus. If a use history does not satisfy the predetermined condition, an X is given to the information indicating whether an image forming apparatus 70 has been registered as a priority apparatus.

The communication device 405 includes modules that comply with various communication standards. For example, the communication device 405 uses a LAN module, a Bluetooth (registered trademark) module, and a communication module for a public switched telephone network.

Configuration of Image Forming Apparatuses

The image forming apparatuses 70 (refer to FIG. 1) used in the present exemplary embodiment have a function of copying documents, a function of printing text and images on sheets, a function of scanning documents, a function of obtaining information necessary to authenticate users, and the like.

Figure 4:
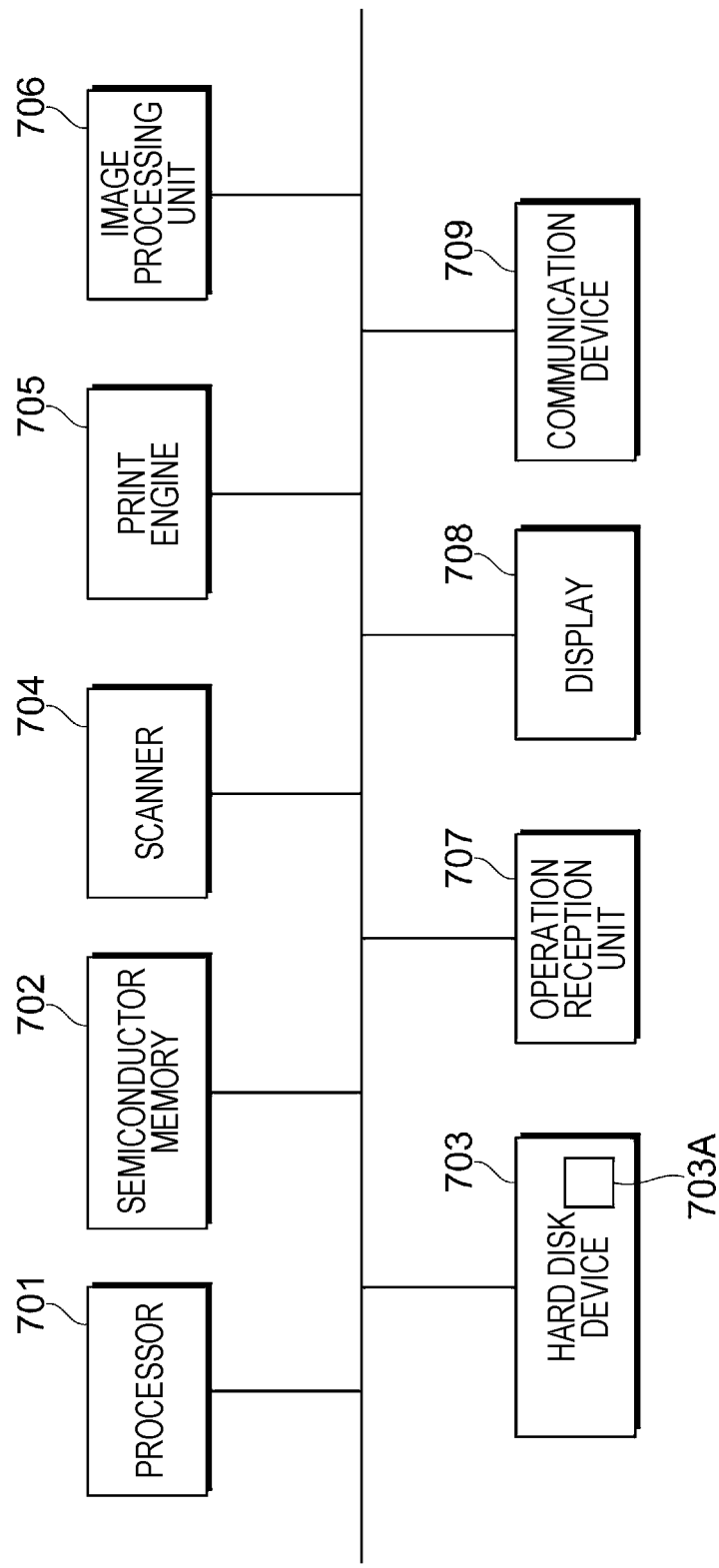
FIG. 4 is a diagram illustrating an example of the configuration of an image forming apparatus used in the first exemplary embodiment.

FIG. 4 is a diagram illustrating an example of the configuration of each of the image forming apparatuses 70 used in the first exemplary embodiment.

The image forming apparatus 70 illustrated in FIG. 4 includes a processor 701 that controls the entirety thereof by executing a program, a semiconductor memory 702 that constitutes a computer along with the processor 701, a hard disk device 703 storing the program, print data, and the like, a scanner 704 that optical reads images of documents, a print engine 705 that forms images on surfaces of sheets, which are an example of a recording medium, an image processing unit 706 that performs color correction, tone correction, or the like on image data to be processed, an operation reception unit 707 used to receive instructions from the user and display information, a display 708 that displays information used for operation, and a communication device 709 used to communicate with the outside. These components are connected to one another by a bus and signal lines, which are not illustrated.

The processor 701 is an example of a first processor.

The semiconductor memory 702 includes a ROM storing BIOS and the like and a RAM used as a working area. The RAM is a storage device.

The hard disk device 703 is an auxiliary storage device that uses a magnetic disk as a storage medium. Alternatively, a semiconductor memory may be used for the auxiliary storage device, too.

In the present exemplary embodiment, the hard disk device 703 stores a list 703A of document files.

FIG. 5 is a diagram illustrating the list 703A of document files. In the present exemplary embodiment, the list 703A of document files is stored in the hard disk device 703 (refer to FIG. 4) of an image forming apparatus 70 (refer to FIG. 1) registered as a priority apparatus. An image forming apparatus 70 that has not been registered as a priority apparatus, therefore, does not store the list 703A of document files.

The list 703A of document files illustrated in FIG. 5 includes information for identifying users, information for identifying locations of the document files, and display names.

The information for identifying users is, for example, mail addresses, employee numbers, names, departments to which the users belong, or the like. In the example illustrated in FIG. 5, mail addresses are used as the information for identifying users.

The information for identifying the locations of the document files indicates locations in the cloud storage 20 (refer to FIG. 1) storing the document files associated with the users. The information for identifying the locations of the document files is, for example, uniform resource locators (URLs).

In the case of the list 703A of document files illustrated in FIG. 5, two document files whose display names are "notepad" and "report", respectively, are stored for Taro Yamada, and one document file whose display name is "weekly report" is stored for Hanako Yokohama.

FIG. 4 will be referred to again.

The scanner 704 is a device that optically reads images of documents and is an example of an image reading unit. The scanner 704 according to the present exemplary embodiment is also provided with a mechanism for feeding documents to a reading position one by one. This type of mechanism is called, for example, an "automatic document feeder (ADF)".

The print engine 705 is a device that prints images on surfaces of sheets using an electrophotographic method, an inkjet method, or the like. The sheets are an example of a recording medium. The print engine 705 is also provided with a mechanism for feeding the sheets one by one. The print engine 705 is an example of an image forming unit.

The image processing unit 706 is achieved by a processor, a processing circuit, or the like dedicated to performing image processing corresponding to a function to be used.

The operation reception unit 707 is a device used by the user to input instructions. The operation reception unit 707 is achieved by a capacitive film sensor or various buttons provided on a surface of the display 708. The capacitive film sensor does not prevent the user from viewing images displayed on the display 708 and is used to detect a position touched by the user.

The display 708 is an organic electroluminescent (EL) display or a liquid crystal display.

The communication device 709 is achieved by modules that comply with various communication standards. The communication device 709 is capable of communicating with, for example, a LAN and a public telephone network.

Process

Process Performed by Print Server

Figure 6:
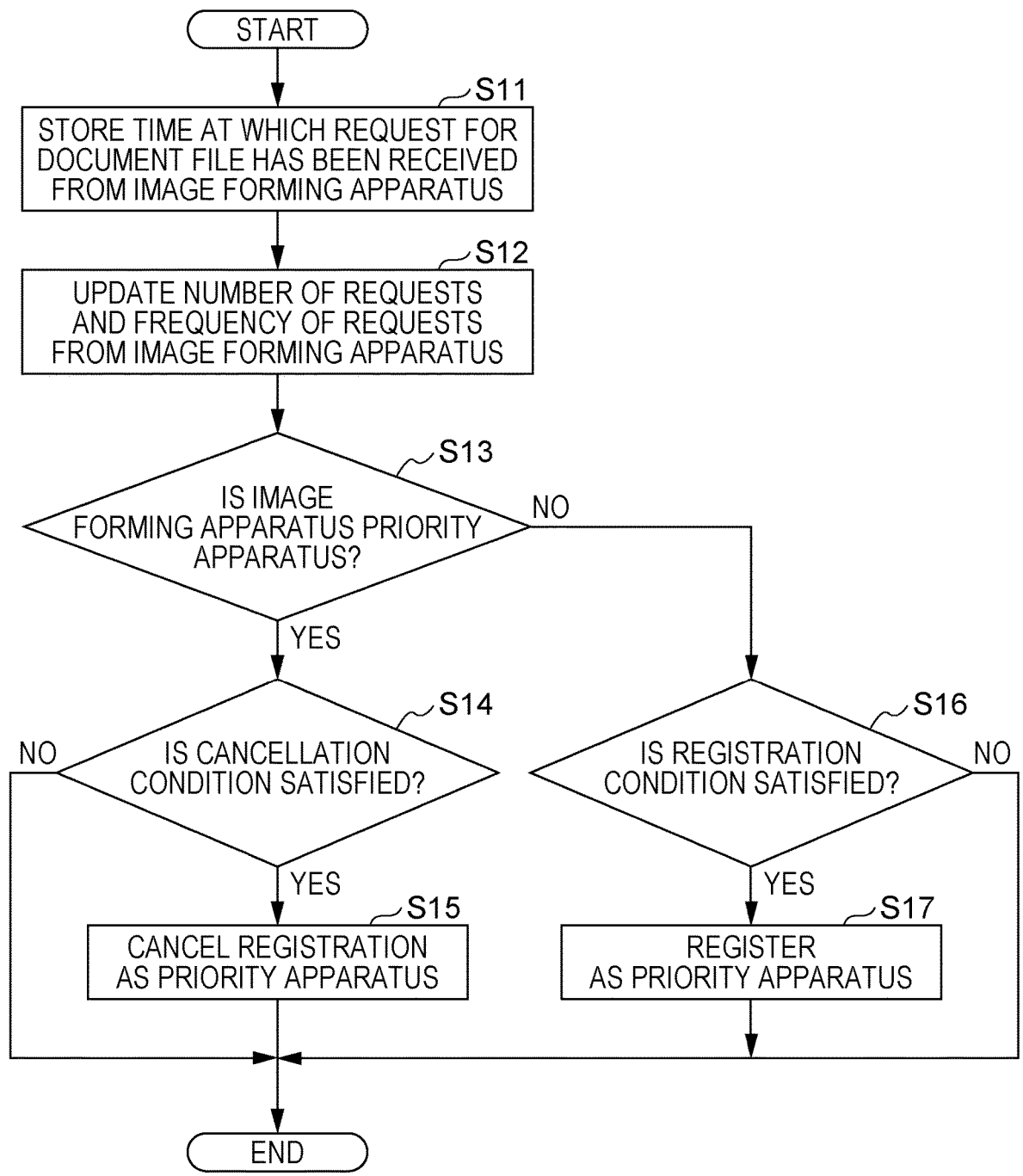
FIG. 6 is a flowchart illustrating an example of a process performed by the print server used in the first exemplary embodiment.

FIG. 6 is a flowchart illustrating an example of a process performed by the print server 40 (refer to FIG. 1) used in the first exemplary embodiment. A symbol "S" in FIG. 6 means a step. The process illustrated in FIG. 6 is performed by the processor 401 (refer to FIG. 2) of the print server 40.

First, the processor 401 stores a time at which a request to obtain a document file has been received from an image forming apparatus 70 (refer to FIG. 1) that has received a request to use the "Print Anywhere" service (step 11).

Next, the processor 401 updates the number of requests and the frequency of requests from the image forming apparatus 70 (step 12). That is, the processor 401 updates a use history on the priority apparatus management table 403A (refer to FIG. 3).

Next, the processor 401 determines whether the image forming apparatus 70 is a priority apparatus (step 13). In the present exemplary embodiment, the processor 401 refers to the priority apparatus management table 403A and determines whether the image forming apparatus 70 has been registered as a priority apparatus.

If the image forming apparatus 70 is a priority apparatus, the processor 401 obtains a positive result in step 13.

In this case, the processor 401 determines whether the use history relating to the image forming apparatus 70 satisfies a cancellation condition (step 14).

Figure 7:
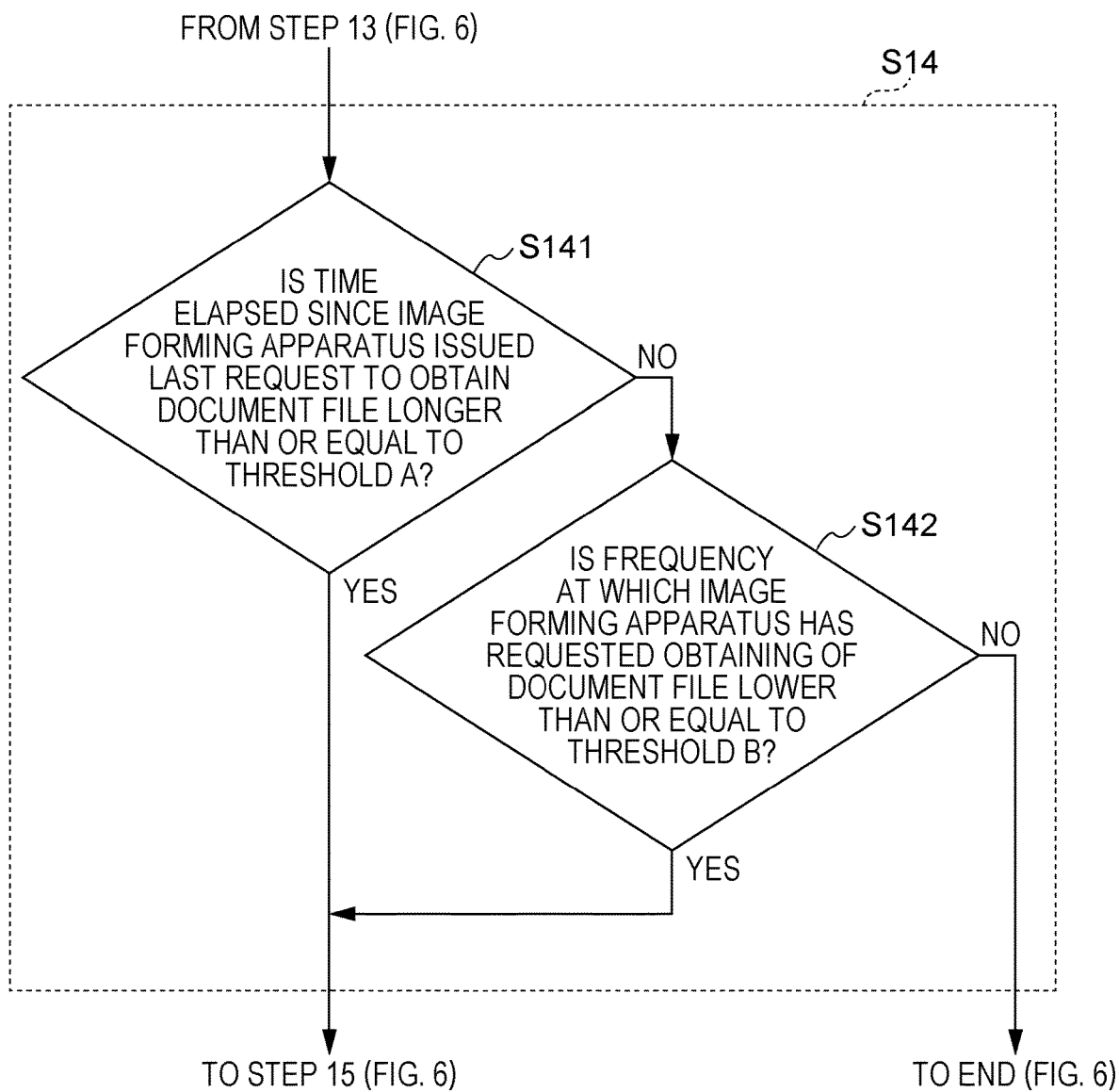
FIG. 7 is a flowchart illustrating an example of processing performed in step 14 in the first exemplary embodiment.

FIG. 7 is a flowchart illustrating an example of processing performed in step 14 in the first exemplary embodiment.

The processor 401 determines whether time elapsed since the image forming apparatus 70 issued a last request to obtain a document file is longer than or equal to a threshold A (step 141). The determination is made to cancel registration, as a priority apparatus, of an image forming apparatus 70 that has not used the "Print Anywhere" service for a long time.

The threshold A is set, for example, on the basis of empirical rules. The threshold A can be changed by a staff member who manages the print server 40.

In the case of an image forming apparatus 70 registered as a priority apparatus, communication for obtaining a list of document files may be omitted, but communication with the print server 40 (refer to FIG. 1) for obtaining a certain document file from the cloud storage 20 (refer to FIG. 1) still remains. The print server 40 manages this kind of access for obtaining a document file in a use history.

If the time elapsed since the last request to obtain a document file is longer than or equal to the threshold A, the processor 401 obtains a positive result in step 141.

If the time elapsed since the last request to obtain a document file is shorter than the threshold A, on the other hand, the processor 401 obtains a negative result in step 141.

If a negative result is obtained in step 141, the processor 401 determines whether a frequency at which the image forming apparatus 70 has requested obtaining of a document file is lower than or equal to a threshold B (step 142). The determination is made to cancel registration, as a priority apparatus, of an image forming apparatus 70 that has recently used the "Print Anywhere" service but has not used the "Print Anywhere" service frequently.

The threshold B, too, is set, for example, on the basis of empirical rules. The threshold B can be changed by the staff member who manages the print server 40.

If the frequency at which the image forming apparatus 70 has requested obtaining of a document file is lower than or equal to the threshold B, the processor 401 obtains a positive result in step 142.

If the frequency at which the image forming apparatus 70 has requested obtaining of a document file exceeds the threshold B, on the other hand, the processor 401 obtains a negative result in step 142.

A case where a positive result is obtained in step 141 or 142 corresponds to a case where a positive result is obtained in step 14. In this case, the processor 401 causes the process to proceed to step 15 (refer to FIG. 6) and cancels the registration of the image forming apparatus 70 as a priority apparatus. After canceling the registration of the image forming apparatus 70 as a priority apparatus, the processor 401 instructs the image forming apparatus 70 to delete the list of document files after completion of printing.

A case where a negative result is obtained in both steps 141 and 142, on the other hand, corresponds to a case where a negative result is obtained in step 14. The conditions used in steps 141 and 142 are examples of a second condition. The threshold A is an example of a second threshold, and the threshold B is an example of a third threshold. In this case, the processor 401 ends the process illustrated in FIG. 6.

FIG. 6 will be referred to again.

If the image forming apparatus 70 is not a priority apparatus, the processor 401 obtains a negative result in step 13.

In this case, the processor 401 determines whether the use history relating to the image forming apparatus 70 satisfies a registration condition (step 16).

Figure 8:
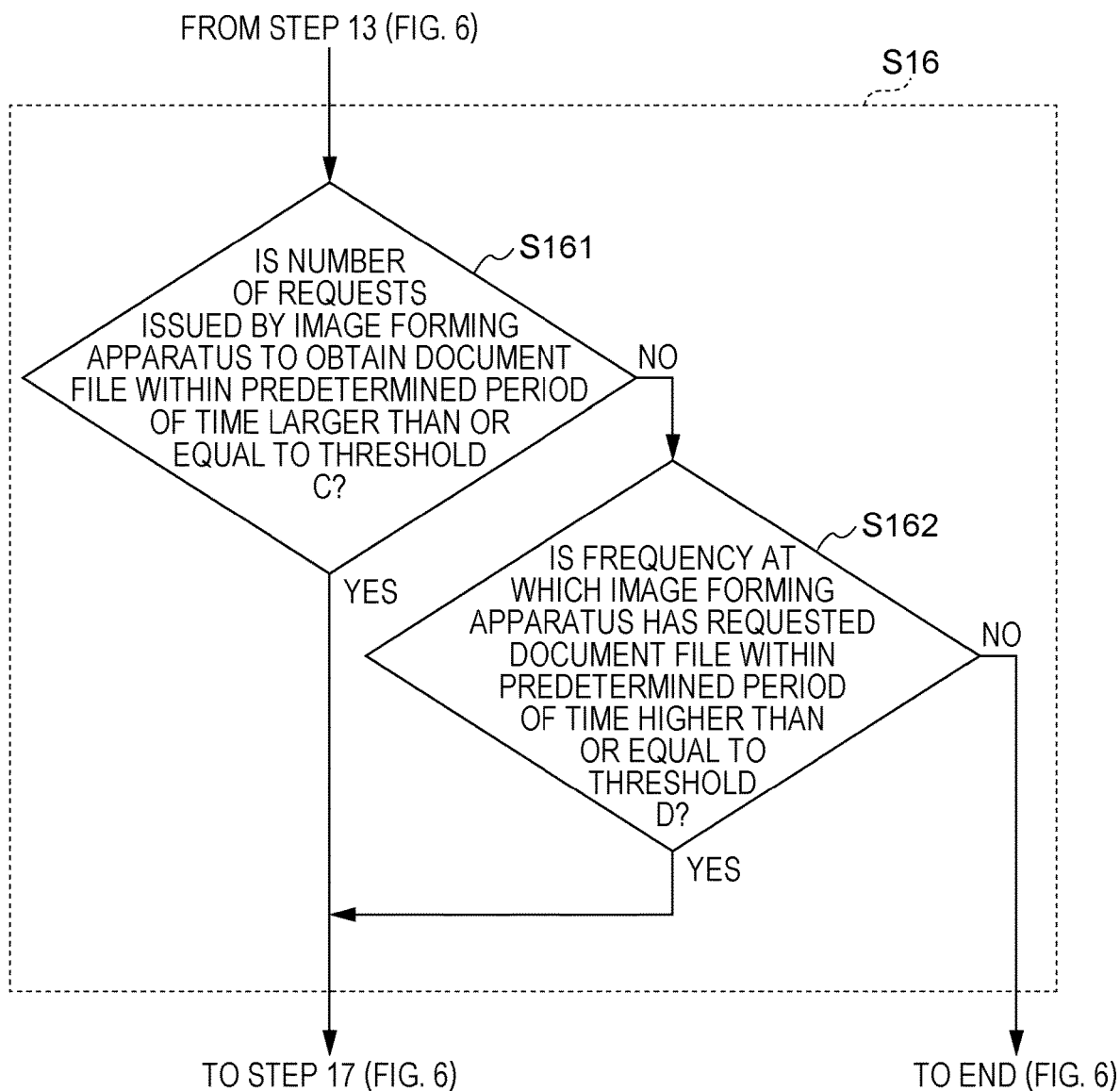
FIG. 8 is a flowchart illustrating an example of processing in step 16 in the first exemplary embodiment.

FIG. 8 is a flowchart illustrating an example of processing performed in step 16 in the first exemplary embodiment.

The processor 401 determines whether the number of requests issued by the image forming apparatus 70 to obtain a document file within a predetermined period of time is larger than or equal to a threshold C (step 161). The determination is made to register an image forming apparatus 70 that has used the "Print Anywhere" service many times as a priority apparatus.

The threshold C is set, for example, on the basis of empirical rules. The threshold C can be changed by the staff member who manages the print server 40.

The predetermined period of time is set, for example, on the basis of empirical rules. The predetermined period of time, too, can be changed by the staff member who manages the print server 40. Each time the predetermined period of time elapses, the number of requests to obtain a document file and a use frequency are reset. These histories, however, may be stored as logs.

If the number of requests to obtain a document file within the predetermined period of time is larger than or equal to the threshold C, the processor 401 obtains a positive result in step 161.

If the number of requests to obtain a document file within the predetermined period of time is smaller than the threshold C, the processor 401 obtains a negative result in step 161.

If a negative result is obtained in step 161, the processor 401 determines whether a frequency at which the image forming apparatus 70 has requested obtaining of a document file within the predetermined period of time is higher than or equal to a threshold D (step 162). The determination is made to register, as a priority apparatus, an image forming apparatus 70 that has not used the "Print Anywhere" service many times but that has used the "Print Anywhere" service frequently.

The threshold D, too, is set, for example, on the basis of empirical rules. The threshold D can be changed by the staff member who manages the print server 40.

A case where a positive result is obtained in step 161 or 162 corresponds to a case where a positive result is obtained in step 16. In this case, the processor 401 causes the process to proceed to step 17 (refer to FIG. 6) and registers the image forming apparatus 70 as a priority apparatus.

A case where a negative result is obtained in both steps 161 and 162 corresponds to a case where a negative result is obtained in step 16. In this case, the processor 401 ends the process illustrated in FIG. 6.

The conditions used in steps 161 and 162 are examples of a predetermined condition. The thresholds C and D are examples of a predetermined threshold.

Process Performed by Image Forming Apparatus

Figure 9:
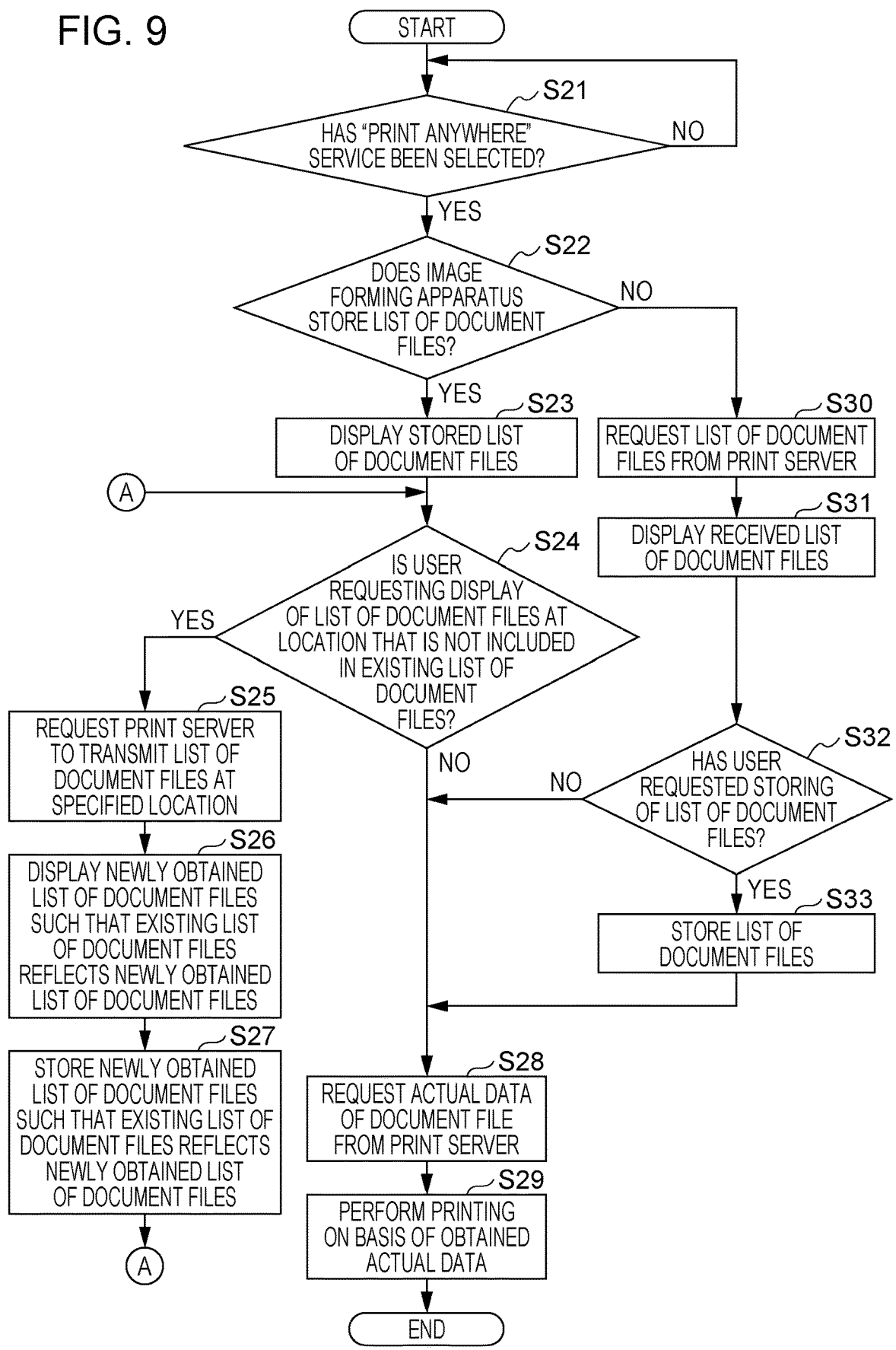
FIG. 9 is a flowchart illustrating an example of a process performed by the image forming apparatus used in the first exemplary embodiment.

FIG. 9 is a flowchart illustrating an example of a process performed by the image forming apparatus 70 (refer to FIG. 1) used in the first exemplary embodiment. A symbol "S" in FIG. 9 means a step. The process illustrated in FIG. 9 is performed by the processor 701 (refer to FIG. 4) of the image forming apparatus 70.

First, the processor 701 determines whether selection of the "Print Anywhere" service has been received (step 21).

In FIG. 9, the processor 701 repeats the determination in step 21 while a negative result is obtained in step 21.

If a positive result is obtained in step 21, the processor 701 determines whether the image forming apparatus 70 stores a list of document files (step 22).

If the image forming apparatus 70 stores a list of document files, the processor 701 obtains a positive result in step 22. In this case, the processor 701 displays the stored list of document files (step 23).

Next, the processor 701 determines whether the user is requesting display of a list of document files at a location that is not included in the existing list of document files (step 24).

If the user is requesting display of a list of document files at a location that is not included in the existing list of document files, the processor 701 obtains a positive result in step 24.

If a positive result is obtained in step 24, the processor 701 requests the print server 40 (refer to FIG. 1) to transmit the list of document files at the specified location (step 25).

The processor 701 then displays the newly obtained list of document files such that the existing list of document files reflects the newly obtained list of document files (step 26).

The processor 701 also stores the newly obtained list of document files such that the existing list of document files reflects the newly obtained list of document files (step 27).

After step 27, the processor 701 causes the process to return to the determination in step 24.

If the user is requesting printing of a document file included in the existing list of document files, the processor 701 obtains a negative result in step 24.

If a negative result is obtained in step 24, the processor 701 requests actual data of the document file from the print server 40 (step 28) and performs printing on the basis of the obtained actual data (step 29).

If a negative result is obtained in step 22, on the other hand, the processor 701 performs step 30. Here, a case where a negative result is obtained in step 22 is a case where the image forming apparatus 70 does not store a list of document files. This corresponds to, for example, a case where the image forming apparatus 70 has not been registered as a priority apparatus.

If a negative result is obtained in step 22, the processor 701 requests a list of document files from the print server 40 (step 30). In the present exemplary embodiment, however, the print server 40 is notified of a request to use the "Print Anywhere" service.

Upon receiving a list of document files from the print server 40, the processor 701 displays the received list of document files (step 31).

Next, the processor 701 determines whether the user has requested storing of the list of document files (step 32).

In the case of an image forming apparatus 70 that has not been registered as a priority apparatus, storing of the list of document files is not requested. The processor 701, therefore, obtains a negative result in step 32 and causes the process to proceed to step 28. Since storing of the list of document files is not requested, the list of document files is deleted from the image forming apparatus 70 after being displayed.

In the case of an image forming apparatus 70 registered as a priority apparatus, on the other hand, storing of the list of document files is requested. The processor 701, therefore, obtains a positive result in step 32 and stores the list of document files (step 33). After performing step 33, the processor 701 causes the process to proceed to step 28.

Overall Processing Sequence in System

When Image Forming Apparatus Is Not Registered as Priority Apparatus

FIG. 10 is a diagram illustrating an example of a processing sequence at a time when an image forming apparatus 70 that has not been registered as a priority apparatus uses the "Print Anywhere" service. A symbol "S" in FIG. 10 means a step.

The processing sequence starts when the user holds an integrated circuit (IC) card onto one of the image forming apparatuses 70 (step 101).

The image forming apparatus 70 receives information regarding the user from the IC card and requests the print server 40 to authenticate the user (step 102). Upon receiving the request, the print server 40 requests the directory server 50 to authenticate the user (step 103). The directory server 50 transmits a result of the authentication to the image forming apparatus 70 via the print server 40.

If successfully authenticated, the user can operate the image forming apparatus 70. For example, the display 708 (refer to FIG. 4) of the image forming apparatus 70 displays buttons that can be used by the user.

If the user is successfully authenticated, the print server 40 determines whether to register the image forming apparatus 70 as a priority apparatus (step 104). Since FIG. 10 illustrates a case where the image forming apparatus 70 is not registered as a priority apparatus, the print server 40 does not register the image forming apparatus 70 as a priority apparatus.

Next, the user requests use of the "Print Anywhere" service (step 105). Upon receiving the request, the image forming apparatus 70 requests use of the "Print Anywhere" service from the print server 40 (step 106). Upon receiving the request, the print server 40 requests the SSO server 60 to authenticate the user (step 107).

If the user is successfully authenticated, the print server 40 requests a list of document files from the cloud storage 20 (step 108).

The cloud storage 20 transmits the list of document files (step 109).

Upon receiving the list of document files, the print server 40 transmits the list of document files to the image forming apparatus 70 (step 110). The image forming apparatus 70 stores the received list of document files.

The image forming apparatus 70 that has received the list of document files receives, from the user, an instruction to display the list of document files and displays the stored list of document files (step 111). In the present exemplary embodiment, a list of document files to be displayed is limited to a list of document files relating to the user authenticated in step 102, and a list of document files relating to another user is not displayed.

The user then selects a certain document file and requests printing (step 112), and the image forming apparatus 70 requests the print server 40 to obtain the selected document file (step 113). The print server 40 requests obtaining of the document file from the cloud storage 20 storing the document file (step 114).

Upon obtaining actual data of the document file, the print server 40 converts a data format of the actual data into a PDL (step 115) and outputs generated print data to the image forming apparatus 70 (step 116). The image forming apparatus 70 then performs printing based on the print data.

As illustrated in FIG. 10, when an image forming apparatus 70 that has not been registered as a priority apparatus requests use of the "Print Anywhere" service, communication for obtaining a list of document files from the cloud storage 20 occurs. The image forming apparatus 70, therefore, needs to wait until a list of document files is displayed after receiving the request to use the "Print Anywhere" service.

When Image Forming Apparatus Is Newly Registered as Priority Apparatus

FIG. 11 is a diagram illustrating an example of a processing sequence at a time when an image forming apparatus 70 newly registered as a priority apparatus uses the "Print Anywhere" service. In FIG. 11, steps similar to those illustrated in FIG. 10 are given similar reference numerals.

This processing sequence, too, starts when the user holds an IC card onto one of the image forming apparatuses 70 (step 101).

The image forming apparatus 70 obtains information regarding the user from the IC card and requests the print server 40 to authenticate the user (step 102). Upon receiving the request, the print server 40 requests the directory server 50 to authenticate the user (step 103). The directory server 50 transmits a result of the authentication to the image forming apparatus 70 via the print server 40.

If successfully authenticated, the user can operate the image forming apparatus 70. For example, the display 708 (refer to FIG. 4) of the image forming apparatus 70 displays buttons that can be used by the user.

If the user is successfully authenticated, the print server 40 determines whether to register the image forming apparatus 70 as a priority apparatus (step 104). In FIG. 11, the image forming apparatus 70 already satisfies the condition for registration as a priority apparatus. The print server 40, therefore, registers the image forming apparatus 70 as a priority apparatus (step 104A).

Next, the user requests use of the "Print Anywhere" service (step 105). In FIG. 11, the image forming apparatus 70 is a priority apparatus, but does not store a list of document files at this stage. The image forming apparatus 70, therefore, requests use of the "Print Anywhere" service from the print server 40 (step 106). Upon receiving the request, the print server 40 requests the SSO server 60 to authenticate the user (step 107).

If the user is successfully authenticated, the print server 40 requests a list of document files from the cloud storage 20 (step 108).

The cloud storage 20 transmits the list of document files (step 109).

Upon receiving the list of document files, the print server 40 transmits the list of document files to the image forming apparatus 70 and requests the image forming apparatus 70 to store the list of document files (step 110A).

Upon receiving the request, the image forming apparatus 70 displays the list of document files (step 111A) and stores the list of document files (step 111B). It is needless to say that in step 111A, the image forming apparatus 70 displays only a list of document files relating to the user authenticated in step 102 and does not display a list of document files relating to another user.

The user then selects a certain document file and requests printing (step 112), and the image forming apparatus 70 requests the print server 40 to obtain the selected document file (step 113). The print server 40 requests the document file from the cloud storage 20 storing the document file (step 114).

Upon obtaining actual data of the document file, the print server 40 converts a data format of the actual data into a PDL (step 115) and outputs generated print data to the image forming apparatus 70 (step 116). The image forming apparatus 70 then performs printing based on the print data.

In FIG. 11, the image forming apparatus 70 is registered as a priority apparatus, but a list of document files is not stored in the image forming apparatus 70 immediately after the registration. Immediately after the print server 40 begins to manage the image forming apparatus 70 as a priority apparatus, therefore, communication for obtaining a list of document files from the cloud storage 20 occurs.

The image forming apparatus 70 therefore needs to wait until a list of document files is displayed after receiving a request to use the "Print Anywhere" service.

Second and Later Uses After Image Forming Apparatus Is Registered as Priority Apparatus FIG. 12 is a diagram illustrating an example of a processing sequence at a time when an image forming apparatus 70 that has already been registered as a priority apparatus uses the "Print Anywhere" service. In FIG. 12, steps similar to those illustrated in FIG. 11 are given similar reference numerals.

This processing sequence, too, starts when the user holds an IC card onto one of the image forming apparatuses 70 (step 101).

The image forming apparatus 70 obtains information regarding the user from the IC card and requests the print server 40 to authenticate the user (step 102). Upon receiving the request, the print server 40 requests the directory server 50 to authenticate the user (step 103). The directory server 50 transmits a result of the authentication to the image forming apparatus 70 via the print server 40.

If successfully authenticated, the user can operate the image forming apparatus 70. For example, the display 708 (refer to FIG. 4) of the image forming apparatus 70 displays buttons that can be used by the user.

If the user is successfully authenticated, the print server 40 determines whether to register the image forming apparatus 70 as a priority apparatus (step 104). In FIG. 12, however, the image forming apparatus 70 has already been registered as a priority apparatus. The print server 40, therefore, also determines whether the image forming apparatus 70 satisfies the cancellation condition of a priority apparatus.

Next, the user requests use of the "Print Anywhere" service (step 105). The image forming apparatus 70 described with reference to FIG. 12 stores a list of document files.

The image forming apparatus 70, therefore, immediately displays the list of document files stored therein (step 111A). In step 111A, the image forming apparatus 70 displays only a list of document files relating to the user authenticated in step 102 and does not display a list of document files relating to another user.

If the user requests display of a list of document files at a location different from that of the displayed list of document files, the image forming apparatus 70 requests the print server 40 to obtain a list of document files at the location specified by the user. In this case, the image forming apparatus 70 waits until the print server 40 transmits a new list of document files. The new list of document files is an example of second information.

The image forming apparatus 70 displays the newly obtained list of document files such that the existing list of document files reflects the newly obtained list of document files.

The user then selects a certain document file and requests printing (step 112), and the image forming apparatus 70 requests the print server 40 to obtain the selected document file (step 113). The print server 40 requests the document file from the cloud storage 20 storing the document file (step 114).

Upon obtaining actual data of the document file, the print server 40 converts a data format of the actual data into a PDL (step 115) and outputs generated print data to the image forming apparatus 70 (step 116). The image forming apparatus 70 then performs printing based on the print data.

In the example illustrated in FIG. 12, the image forming apparatus 70 can display a list of document files without communicating with the print server 40. That is, with the image forming apparatus 70 in the example illustrated in FIG. 12, time taken to display a list of document files after a request to use the "Print Anywhere" service is received is reduced.

When Registration of Image Forming Apparatus as Priority Apparatus is Canceled

If an image forming apparatus 70 registered as a priority apparatus satisfies the cancellation condition of a priority apparatus, the processing sequence illustrated in FIG. 11 is used.

In the present exemplary embodiment, if determining that an image forming apparatus 70 that has requested user authentication satisfies the cancellation condition of a priority apparatus, the print server 40 cancels, in step 104A, registration of the image forming apparatus 70 as a priority apparatus and requests the image forming apparatus 70 to delete a list of document files. This is a difference from the processing sequence illustrated in FIG. 11.

If the user requests use of the "Print Anywhere" service from the image forming apparatus 70, therefore, the print server 40 obtains a list of document files from the cloud storage 20 and transmits the list of document files to the image forming apparatus 70.

Second Exemplary Embodiment

In a second exemplary embodiment, a case will be described where the print server 40 (refer to FIG. 1) has a function of keeping up to date a list of document files stored in image forming apparatuses 70 (refer to FIG. 1) registered as priority apparatuses.

A system configuration and the configuration of the apparatuses used in the present exemplary embodiment are the same as in the first exemplary embodiment.

FIG. 13 is a flowchart illustrating an example of a process performed by a print server 40 (refer to FIG. 1) used in the second exemplary embodiment. A symbol "S" in FIG. 13 means a step. The process illustrated in FIG. 13 is performed by the processor 401 of the print server 40 (refer to FIG. 2).

The processor 401 determines whether a notification about a change to a document file has been received from the cloud storage 20 (step 31). The cloud storage 20 transmits the notification using the asynchronous API. The user changes a document file stored in the cloud storage 20 using the user terminal 30 (refer to FIG. 1).

A change to a document file may be insertion, update, or deletion. When the cloud storage 20 detects a change to a document file, the cloud storage 20 immediately notifies the print server 40 set as a notification destination in advance of the change.

Alternatively, the print server 40 may regularly inquire of the cloud storage 20 about presence or absence of a change to a document file. The synchronous API provided for the cloud storage 20 is used for the inquiry.

The processor 401 repeats the determination in step 31 while a positive result is obtained in step 31.

If a positive result is obtained in step 31, the processor 401 determines whether there is a priority apparatus to which a list including the document file has been transmitted (step 32).

If a negative result is obtained in step 32, there is no list to reflect the change. The processor 401, therefore, ends the process.

If a positive result is obtained in step 32, on the other hand, the processor 401 notifies the priority apparatus, that is, an image forming apparatus 70, of the change to the document file (step 33). The notification includes details of the change.

FIG. 14 is a diagram illustrating an example of a processing sequence used when a list of document files reflects a change to a document file. A symbol "S" in FIG. 14 means a step.

The processing sequence starts when the user changes a document file stored in the cloud storage 20 using the user terminal 30 (step 121).

The cloud storage 20 detects the change to the document file and notifies the print server 40 of the change (step 122).

Upon receiving the notification, the print server 40 identifies a priority apparatus to which a list including the document file has been transmitted (step 123).

Next, the print server 40 notifies the identified priority apparatus, that is, an image forming apparatus 70, of the change to the document file (step 124). In other words, the print server 40 pushes a notification about the change to the document file to the image forming apparatus 70.

Upon receiving the notification about the change to the document file, the image forming apparatus 70 causes the list of document file stored therein to reflect the change (step 125). As a result, the list of document files stored in the image forming apparatus 70 is synchronized with a list of document files stored in the cloud storage 20.

That is, the list of document files displayed on the image forming apparatus 70 operated by the user constantly reflects a state of the cloud storage 20. Consequently, a document file selected by the user always exists at a location specified by the user for the image forming apparatus 70, and the user need not wait until a list of document file is obtained again.

In this case, the image forming apparatus 70 stores the list of document files before the user requests display of the list of document files. When the user requests display of the list of document files, therefore, a latest list of document files is displayed without waiting time.

FIGS. 15A to 15C are diagrams illustrating examples in which the list 703A of document files stored in the image forming apparatus 70 is changed. FIG. 15A illustrates an example in which a document file is inserted. FIG. 15B illustrates an example in which a document file is updated. FIG. 15C illustrates an example in which a document file is deleted.

When a document file is inserted, information regarding the newly added document file is added to the list 703A of document files stored in the image forming apparatus 70. In FIG. 15, "notepad" is added the list 703A of document files.

When a document file is updated, for example, information regarding the updated document file is updated in the list 703A of document files stored in the image forming apparatus 70. In FIG. 15, a display name is updated from "notepad" to "notepad2". In addition, information for identifying the user and information for identifying a location of the document file might also be updated.

When a document file is deleted, for example, information regarding the document file to be deleted is deleted from the list 703A of document files stored in the image forming apparatus 70.

Third Exemplary Embodiment

A print server 40 used in a third exemplary embodiment sets a priority apparatus for each user. The number of users in the present exemplary embodiment is one.

A system configuration and the configuration of the apparatuses used in the present exemplary embodiment are the same as in the first exemplary embodiment.

FIG. 16 is a diagram illustrating an example of a priority apparatus management table 403A1 used in the third exemplary embodiment. In FIG. 16, an element similar to that illustrated in FIG. 3 is given a similar reference numeral.

The priority apparatus management table 403A1 used by the print server 40 to manage priority apparatuses stores information for identifying image forming apparatuses, information indicating whether the image forming apparatuses are registered as priority apparatuses, and use frequencies while associating these pieces of information with information for identifying users.

Use histories on the priority apparatus management table 403A1 illustrated in FIG. 16 are use histories of certain image forming apparatuses 70 by certain users. This is a difference from the above-described exemplary embodiments. Whether an image forming apparatus 70 is registered as a priority apparatus, therefore, is determined for each user. That is, an image forming apparatus 70 that has been registered as a priority apparatus for a user might not have been registered as a priority apparatus for another user.

Figure 17:
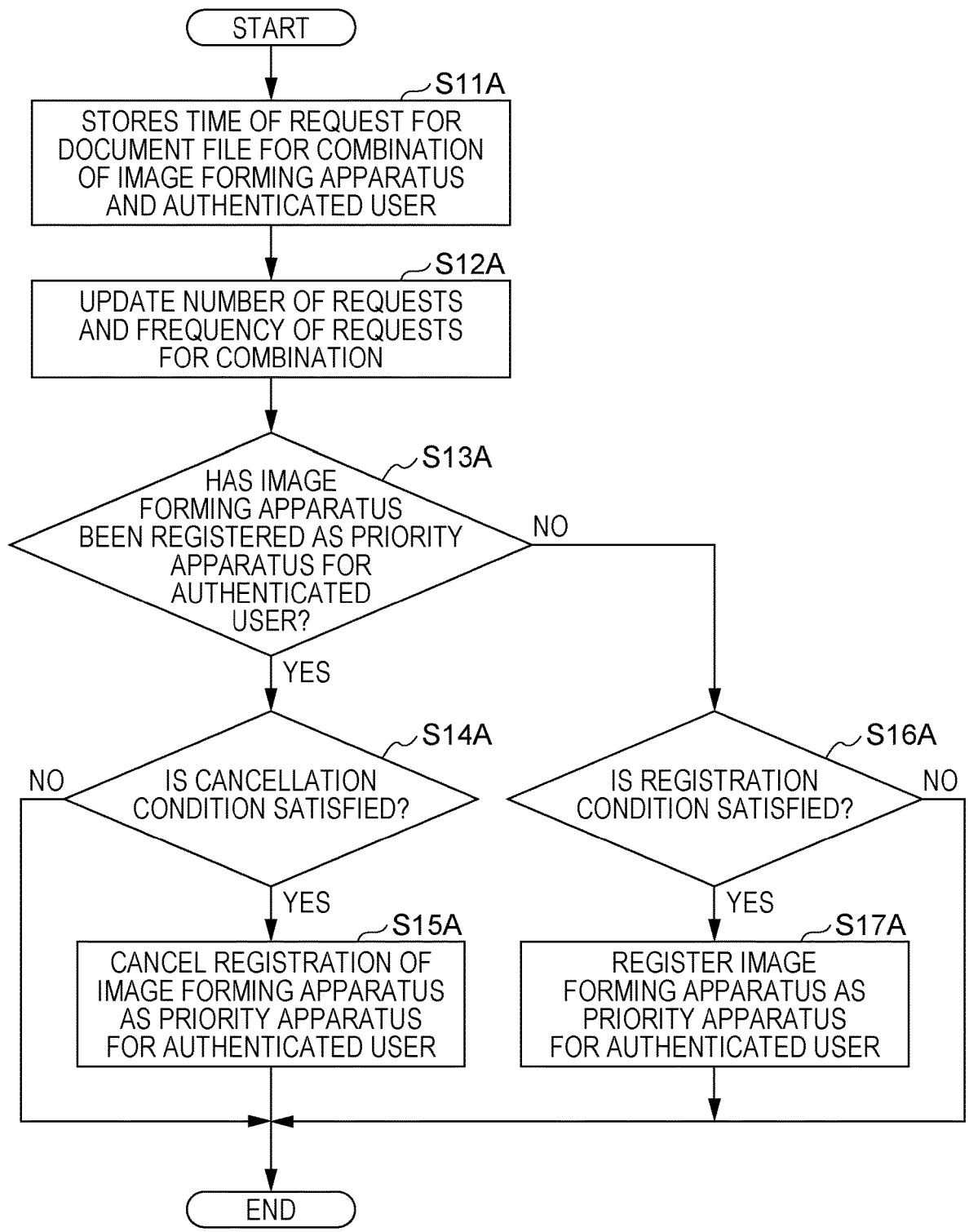
FIG. 17 is a flowchart illustrating an example of a process performed by a print server used in the third exemplary embodiment.

FIG. 17 is a flowchart illustrating an example of a process performed by the print server 40 (refer to FIG. 1) used in the third exemplary embodiment. In FIG. 17, steps similar to those illustrated in FIG. 6 are given similar reference numerals.

The process illustrated in FIG. 17 is performed by the processor 401 (refer to FIG. 2) of the print server 40.

First, the processor 401 stores a time of a request to obtain a document file for a combination of an image forming apparatus 70 (refer to FIG. 1) that has received a request for the "Print Anywhere" service and an authenticated user (step 11A).

Next, the processor 401 updates the number of requests and a frequency of requests for the combination (step 12A). That is, the processor 401 updates a use history on the priority apparatus management table 403A1 (refer to FIG. 16).

Next, the processor 401 determines whether the image forming apparatus 70 has been registered as a priority apparatus for the authenticated user (step 13A). In the present exemplary embodiment, the processor 401 refers to the priority apparatus management table 403A1 and determines whether the image forming apparatus 70 has been registered as a priority apparatus for the authenticated user.

If the image forming apparatus 70 has been registered as a priority apparatus for the authenticated user, the processor 401 obtains a positive result in step 13A.

In this case, the processor 401 determines whether a use history for the user who is using the image forming apparatus 70 satisfies the cancellation condition (step 14A).

Figure 18:
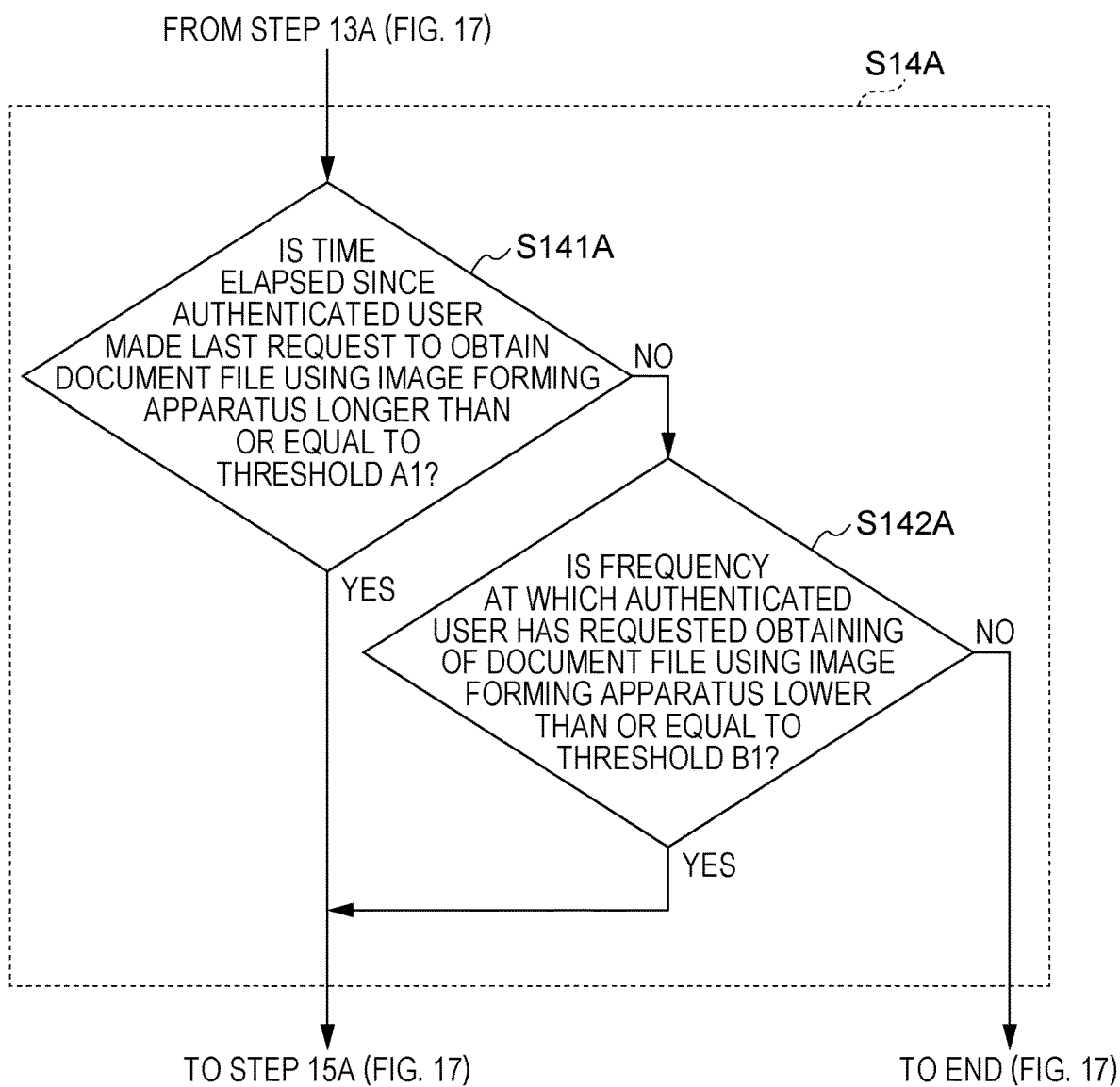
FIG. 18 is a flowchart illustrating an example of processing performed in step 14A in the third exemplary embodiment.

FIG. 18 is a flowchart illustrating an example of processing performed in step 14A in the present exemplary embodiment.

The processor 401 determines whether time elapsed since the authenticated user made a last request to obtain a document file using the image forming apparatus 70 is longer than or equal to a threshold A1 (step 141A). The determination is made to cancel registration of an image forming apparatus 70 as a priority apparatus for a combination of a user and an image forming apparatus 70 that has not used the "Print Anywhere" service for a long time.

The threshold A1 is set, for example, on the basis of empirical rules. The threshold A1 can be changed by the staff member who manages the print server 40.

In the case of a combination of a user and an image forming apparatus 70 for which time elapsed since a last request to obtain a document file is longer than or equal to threshold A1, the processor 401 obtains a positive result in step 141A.

In the case of a combination of a user and an image forming apparatus 70 for which time elapsed since a last request to obtain a document file is shorter than the threshold A1, on the other hand, the processor 401 obtains a negative result in step 141A.

If a negative result is obtained in step 141A, the processor 401 determines whether a frequency at which the authenticated user requests obtaining of a document file using the image forming apparatus 70 is lower than or equal to a threshold B1 (step 142A). The determination is made to cancel registration of an image forming apparatus 70 as a priority apparatus for a combination of a user and an image forming apparatus 70 that has recently used the "Print Anywhere" service but has not frequently used the "Print Anywhere" service.

The threshold B1, too, is set, for example, on the basis of empirical rules. The threshold B1 can be changed by the staff member who manages the print server 40.

In the case of a combination of a user and an image forming apparatus 70 whose frequency of requests to obtain a document file is lower than or equal to the threshold B1, the processor 401 obtains a positive result in step 142A.

In the case of a combination of a user and an image forming apparatus 70 whose frequency of requests to obtain a document file exceeds the threshold B1, on the other hand, the processor 401 obtains a negative result in step 142A.

A case where a positive result is obtained in step 141A or 142A corresponds to a case where a positive result is obtained in step 14A. In this case, the processor 401 causes the process to proceed to step 15A (refer to FIG. 17) and cancels registration as a priority apparatus for a combination of the image forming apparatus 70 and the user. In the present exemplary embodiment, after canceling registration as a priority apparatus, the processor 401 instructs the image forming apparatus 70 to delete a list of document files relating to the user once the image forming apparatus 70 completes printing.

A case where a negative result is obtained in both steps 141A and 142A, on the other hand, corresponds to a case where a negative result is obtained in step 14A. The conditions used in steps 141A and 142A are other examples of the second condition. The threshold A1 is another example of the second threshold, and the threshold B1 is another example of the third threshold. In this case, the processor 401 ends the process illustrated in FIG. 17.

FIG. 17 will be referred to again.

If the image forming apparatus 70 is not a priority apparatus for the authenticated user, the processor 401 obtains a negative result in step 13A.

In this case, the processor 401 determines whether a use history for a combination of the authenticated user and the image forming apparatus 70 satisfies the registration condition (step 16A).

Figure 19:
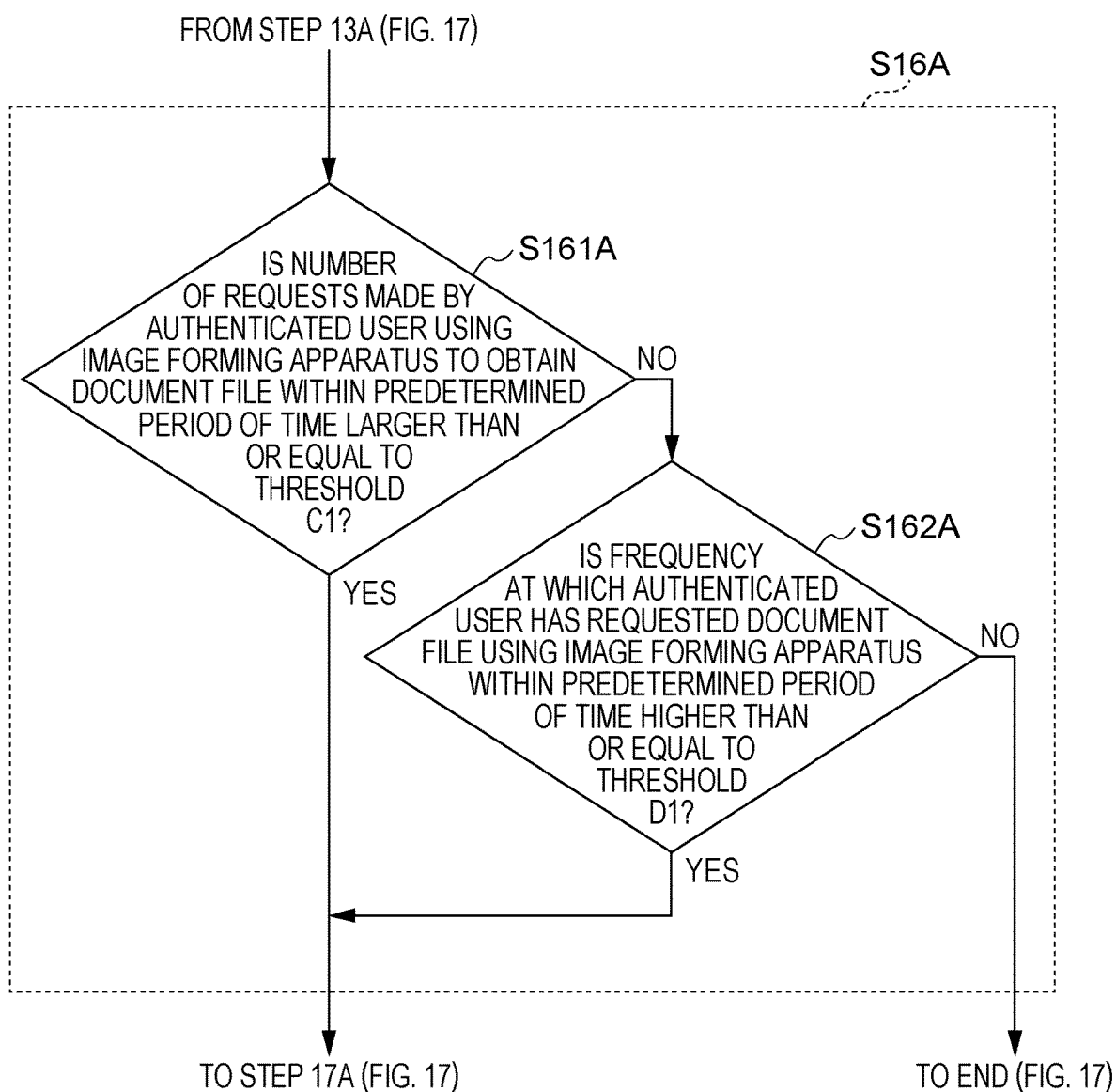
FIG. 19 is a flowchart illustrating an example of processing performed in step 16A in the third exemplary embodiment.

FIG. 19 is a flowchart illustrating an example of processing performed in step 16A in the third exemplary embodiment.

The processor 401 determines whether the number of requests made by the authenticated user within a predetermined period of time using the image forming apparatus 70 is larger than or equal to a threshold C1 (step 161A). The determination is made to register an image forming apparatus 70 as a priority apparatus for a combination of a user and an image forming apparatus 70 that has used the "Print Anywhere" service many times.

The threshold C1 is set, for example, on the basis of empirical rules. The threshold C1 can be changed by the staff member who manages the print server 40.

The predetermined period of time is set, for example, on the basis of empirical rules. The predetermined period of time, too, can be changed by the staff member who manages the print server 40. Each time the predetermined period of time elapses, the number of requests to obtain a document file and a use frequency associated with the combination of the user and the image forming apparatus 70 are reset. These histories, however, may be stored as logs.

If the number of requests made to obtain a document file within the predetermined period of time is larger than or equal to the threshold C1, the processor 401 obtains a positive result in step 161A.

If the number of requests made to obtain a document file within the predetermined period of time is smaller than the threshold C1, on the other hand, the processor 401 obtains a negative result in step 161A.

If a negative result is obtained in step 161A, the processor 401 determines whether a frequency at which the authenticated user has requested a document file within the predetermined period of time using the image forming apparatus 70 is higher than or equal to the threshold D1 (step 162A). The determination is made to register an image forming apparatus 70 as a priority apparatus for a combination of a user and an image forming apparatus 70 that has not used the "Print Anywhere" service many times but that has used the "Print Anywhere" service frequently.

The threshold D1, too, is set, for example, on the basis of empirical rules. The threshold D1 can be changed by the staff member who manages the print server 40.

A case where a positive result is obtained in step 161A or 162A corresponds to a case where a positive result is obtained in step 16A (refer to FIG. 17). In this case, the processor 401 causes the process to proceed to step 17A (refer to FIG. 17) and registers the image forming apparatus 70 as a priority apparatus for the authenticated user.

A case where a negative result is obtained in both steps 161A and 162A, on the other hand, corresponds to a case where a negative result is obtained in step 16A (refer to FIG. 17). The conditions in steps 161A and 162A are other examples of a predetermined condition. The thresholds C1 and D1 are other examples of a predetermined threshold. In this case, the processor 401 ends the process illustrated in FIG. 17.

Figure 20:
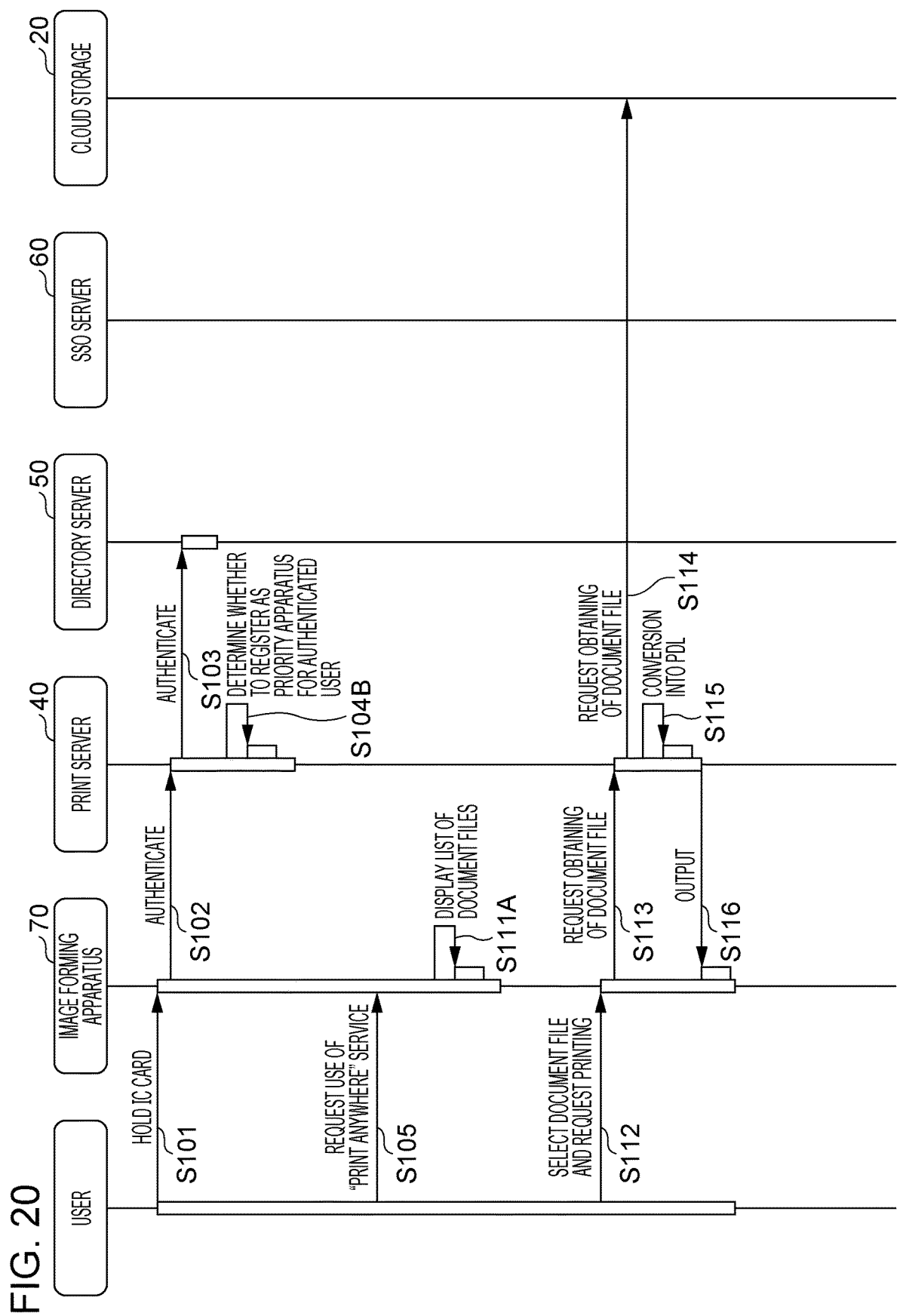
FIG. 20 is a diagram illustrating an example of a processing sequence at a time when an image forming apparatus registered as a priority apparatus for a certain user uses the "Print Anywhere" service.

FIG. 20 is a diagram illustrating an example of a processing sequence at a time when an image forming apparatus 70 registered as a priority apparatus for a certain user uses the "Print Anywhere" service. In FIG. 20, steps similar to those illustrated in FIG. 12 are given similar reference numerals.

Whereas the print server 40 illustrated in FIG. 12 determines whether to register an image forming apparatus 70 as a priority apparatus without distinguishing users from one another, the print server 40 illustrated in FIG. 20 determines whether to register an image forming apparatus 70 as a priority apparatus for an authenticated user after the image forming apparatus 70 requests the print server 40 to authenticate the user (step 104B).

As for a processing sequence at a time when an image forming apparatus 70 operated by a user has not been registered as a priority apparatus for the user, FIG. 10 may be referred to. It is needless to say that whether an image forming apparatus 70 has been registered as a priority apparatus is determined for a user who is requesting authentication.

As for a processing sequence at a time when an image forming apparatus 70 operated by a user is newly registered as a priority apparatus for the user, FIG. 11 may be referred to. It is needless to say that whether an image forming apparatus 70 has been registered as a priority apparatus is determined for a user who is requesting authentication, and registration as a priority apparatus is performed for each user.

Fourth Exemplary Embodiment

A case where the print server 40 described in the third exemplar embodiment also has a function of keeping up to date a list of document files stored in an image forming apparatus 70 (refer to FIG. 1) registered as a priority apparatus will be described hereinafter.

A system configuration and the configuration of the apparatuses used in the present exemplary embodiment are the same as in the third exemplary embodiment.

Figure 21:
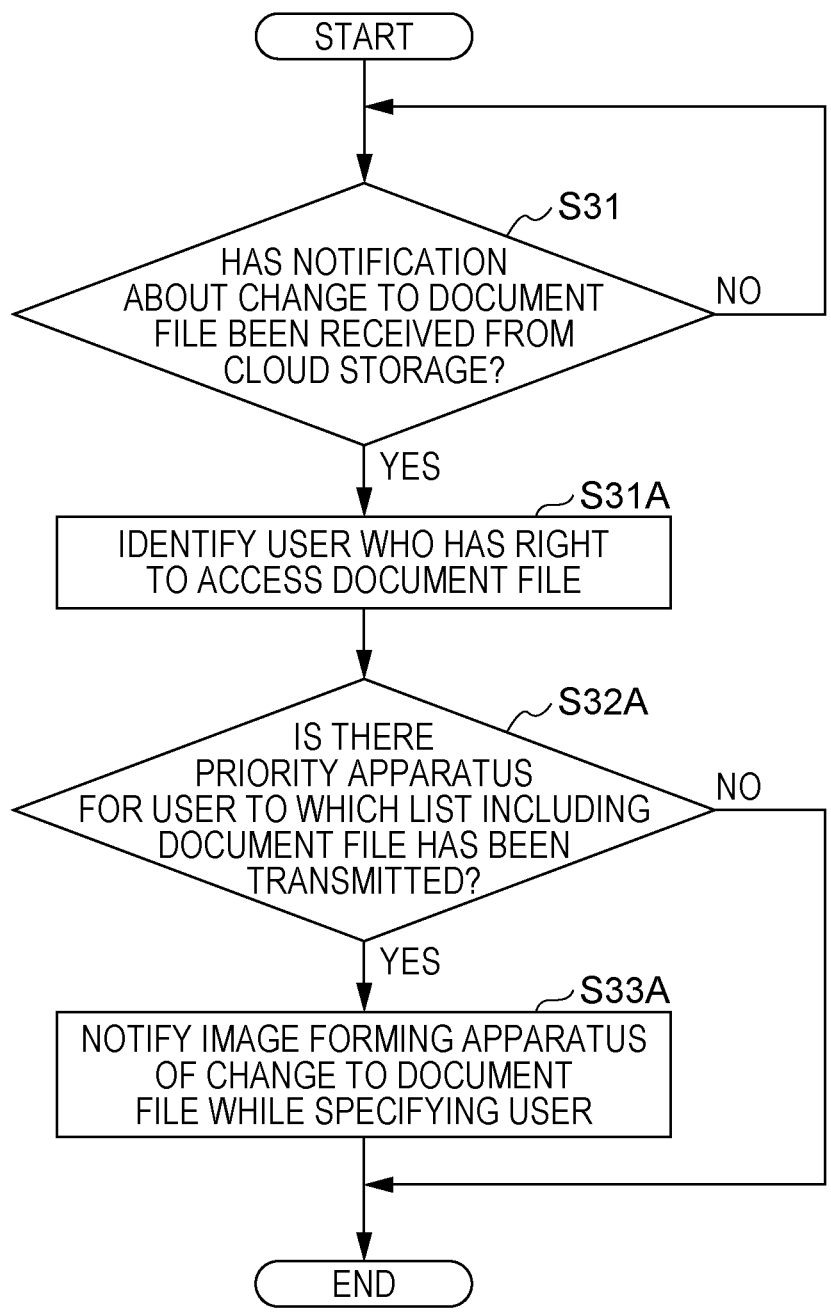
FIG. 21 is a flowchart illustrating an example of a process performed by a print server used in a fourth exemplary embodiment.

FIG. 21 is a flowchart illustrating an example of a process performed by the print server 40 (refer to FIG. 1) used in the fourth exemplary embodiment. In FIG. 21, steps similar to those illustrated in FIG. 13 are given similar reference numerals.

The process illustrated in FIG. 21 is performed by the processor 401 (refer to FIG. 2) of the print server 40.

The processor 401 determines whether a notification about a change to a document file has been received from the cloud storage 20 (step 31). The notification is made by the cloud storage 20 using the asynchronous API.

The processor 401 repeats step 31 while a negative result is obtained in step 31.

If a positive result is obtained in step 31, on the other hand, the processor 401 identifies a user who has a right to access the document file (step 31A).

Next, the processor 401 determines whether there is a priority apparatus for the user to which a list including the document file has been transmitted (step 32A).

If a negative result is obtained in step 32A, there is no list to reflect the change. The processor 401, therefore, ends the process.

If a positive result is obtained in step 32A, on the other hand, the processor 401 notifies the priority apparatus, that is, an image forming apparatus 70, of the change to the document file while specifying the user (step 33A). The notification includes details of the change.

Figure 22:
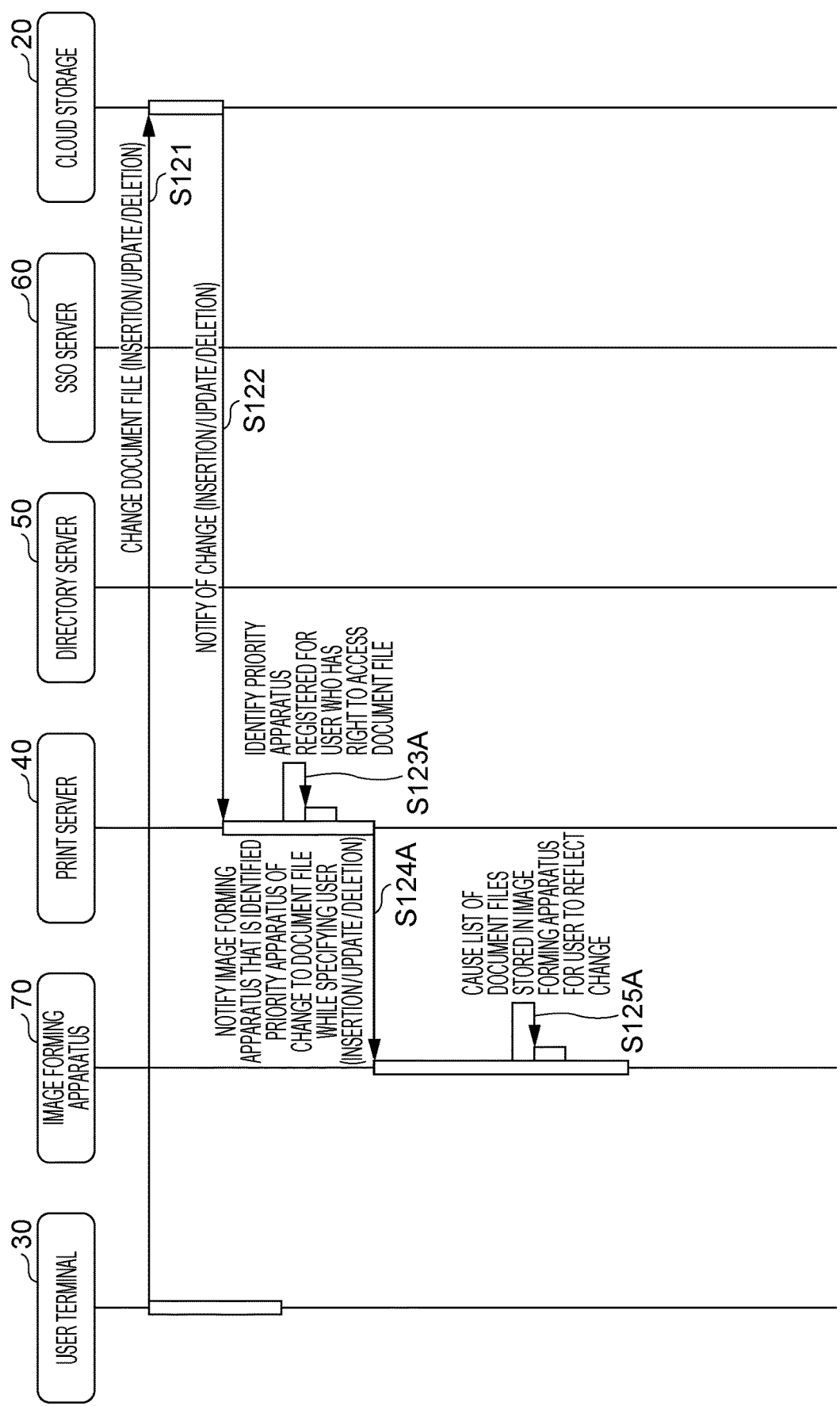
FIG. 22 is a diagram illustrating an example of a processing sequence used when a list of document files reflects a change to a document file.

FIG. 22 is a diagram illustrating an example of a processing sequence used when a list of document files reflects a change to a document file. In FIG. 22, steps similar to those illustrated in FIG. 14 are given similar reference numerals.

The processing sequence starts when the user changes a document file stored in the cloud storage 20 using the user terminal 30 (step 121).

Upon detecting the change to the document file, the cloud storage 20 notifies the print server 40 of the change to the document file (step 122).

Upon receiving the notification, the print server 40 identifies a priority apparatus registered for a user who has a right to access the document file (step 123A).

Next, the print server 40 notifies the identified priority apparatus, that is, an image forming apparatus 70, of the change to the document file while specifying the user (step 124A).

Upon receiving the notification about the change to the document file, the image forming apparatus 70 causes a list of document files stored therein for the user to reflect details of the notification (step 125A).

As a result, the list of document files relating to the user stored in the image forming apparatus 70 and a list of document files stored in the cloud storage 20 are synchronized with each other. That is, a list of document files displayed on the image forming apparatus 70 operated by the user constantly reflects the state of the cloud storage 20.

Consequently, a document file selected by the user always exists at a location specified by the user for the image forming apparatus 70, and the user need not wait until a list of document file is obtained again.

Although a change in a list of document files stored in the image forming apparatus 70 is managed in association with a user, a list of document files may be changed regardless of a user, and filtering may be performed when the list of document file is presented to the user.

Other Exemplary Embodiment

Although some exemplary embodiments of the present disclosure have been described, the technical scope of the present disclosure is not limited to these exemplary embodiments. It is evident from the claims that the technical scope of the present disclosure also includes modes obtained by modifying or improving the above-described exemplary embodiments in various ways.

Although the network system 1 described in the above exemplary embodiments is constructed in the cloud network 10, for example, the network system 1 may be constructed in a LAN, instead.

Although an image forming apparatus 70 (refer to FIG. 1) registered as a priority apparatus obtains a list of document files when the image forming apparatus 70 uses the "Print Anywhere" service for the first time in the first exemplary embodiment, a timing at which the image forming apparatus 70 obtains a list of document files is not limited to this.

For example, the print server 40 (refer to FIG. 1) may push a list of document files to an image forming apparatus 70 if the image forming apparatus 70 is registered as a priority apparatus. In this case, unlike in the first exemplary embodiment, a list of document files is stored in the image forming apparatus 70 before the image forming apparatus 70 uses the "Print Anywhere" service for the first time. Consequently, the list of document files is displayed without waiting time even when the image forming apparatus 70 uses the "Print Anywhere" service for the first time.

Alternatively, the image forming apparatus 70 may obtain a list of document files using a notification about a print job from the user terminal 30 (refer to FIG. 1) as a trigger. In this case, the list of document files is stored in the image forming apparatus 70 before the user logs in or requests use of the "Print Anywhere" service.

When a print job is transmitted to the print server 40, or when the image forming apparatus 70 notifies the print server 40 of reception of a print job, the print server 40 may obtain a list of document files and deliver the list of document files to the image forming apparatus 70. In this case, too, the list of document files is stored in the image forming apparatus 70 before the user logs in or requests use of the "Print Anywhere" service.

Although when the user terminal 30 requests the cloud storage 20 (refer to FIG. 1) to change a document file, the print server 40 notifies the image forming apparatus 70 of the change to the document file in the second exemplary embodiment, the cloud storage 20 may, when the user terminal 30 uploads a document file to the cloud storage 20, transmit a list of document files including the uploaded document file to the image forming apparatus 70 via the print server 40, instead. In this case, too, the list of document files is stored in the image forming apparatus 70 before the user logs in or requests use of the "Print Anywhere" service.

Although a history of requests to obtain a document file issued by the image forming apparatus 70 to the cloud storage 20 is used to determine whether to register, or cancel registration of, the image forming apparatus 70 as a priority apparatus in the above exemplary embodiments, a request to authenticate the user made using the image forming apparatus 70, which precedes a request to obtain a document file, may be regarded as a request to obtain a document file. This is because the user needs to be authenticated before the user requests obtaining of a document file. In this case, the history is updated when the user requests authentication, and a time difference between a timing of a determination whether an image forming apparatus 70 is a priority apparatus and a last use of the image forming apparatus 70 can be eliminated.

Although the number of image forming apparatuses 70 registered as a priority apparatus is not limited in the above exemplary embodiments, an upper limit may be given to the number of image forming apparatuses 70 that can be registered as a priority apparatus, instead.

Although the print server 40 (refer to FIG. 1) manages the priority apparatus management table 403A (refer to FIG. 3) and the priority apparatus management table 403A1 (refer to FIG. 16) in the above exemplary embodiments, the directory server 50 may manage these tables, instead.

Although a case where the number of users is one is assumed in the above exemplary embodiments, a priority apparatus may be managed in units of plural users. The plural users may belong to an organizational unit such as a department, a section, or a subsection, for example, or a private group such as a family, a circle, or a club. In this case, an image forming apparatus 70 registered as a priority apparatus stores a list of document files not only before each user requests display of the list of document files but also before each user logs in to the priority apparatus. Each user, therefore, checks the list of document files without waiting time.

Although a case where the image forming apparatus 70 having plural functions obtains a document file from the cloud storage 20 and prints the document file has been described in the above exemplary embodiments, the image forming apparatus 70 may be a print-only apparatus or a three-dimensional printer that forms a three-dimensional object by stacking on one another cross-sectional figures defined by three-dimensional data, instead.

Although the image forming apparatus 70 (refer to FIG. 1) has been described as an example of an information terminal that obtains a document file from the cloud storage 20 (refer to FIG. 1) in the above exemplary embodiments, an information kiosk may be used instead of the image forming apparatus 70. The information kiosk is a terminal that is capable of providing information and services and that is used for payment and various procedures. That is, a service provided in the network system 1 is not limited to the "Print Anywhere" service, and may be provision of various pieces of information, a financial service, or the like.

Although the print server 40 (refer to FIG. 1) has been described as an example of an information processing apparatus that mediates communication with an information terminal that obtains a document file from a cloud storage in the above exemplary embodiments, the information processing apparatus may be a communication apparatus such as a router or a gateway apparatus, instead.

Although a case where a file stored in a cloud storage is a document file has been described in the above exemplary embodiments, a document file regarding financial data or medical data may be stored in a cloud storage, instead.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
receive, from an external apparatus, a request to output a file to be output by an information terminal,
identify, in cooperation with the external apparatus, an information terminal that satisfies a predetermined condition among a plurality of information terminals that are candidates for a target to which the file is to be output, and
transmit, to the identified information terminal, first information to be used to identify the file before a user requests the identified information terminal to display information regarding the file, wherein
the predetermined condition is that a number of file requests by the identified information terminal exceeds a predetermined threshold.

2. The information processing apparatus according to claim 1, wherein
the processor is configured to, if the processor receives a file request from the identified information terminal, transmit actual data of the file to the identified information terminal separately from the first information.

3. The information processing apparatus according to claim 1, wherein
the number of file requests is managed for each of predetermined periods of time.

4. The information processing apparatus according to claim 1, wherein
the number of file requests is managed without distinguishing users from one another.

5. The information processing apparatus according to claim 3, wherein
the number of file requests is managed without distinguishing users from one another.

6. The information processing apparatus according to claim 1, wherein
the number of file requests is managed for each of users.

7. The information processing apparatus according to claim 3, wherein
the number of file requests is managed for each of users.

8. The information processing apparatus according to claim 1, wherein
the processor is configured to, even in a case where the information terminal satisfies the predetermined condition, exclude the information terminal as the target to which the first information is to be transmitted, if a state where there is no file request satisfies a predetermined second condition.

9. The information processing apparatus according to claim 8, wherein
the second condition is that a period of time for which no file request is received exceeds a predetermined second threshold.

10. The information processing apparatus according to claim 8, wherein
the second condition is that the number of file requests within a predetermined period of time is smaller than a predetermined third threshold.

11. The information processing apparatus according to claim 8, wherein
the exclusion is managed for each of users.

12. The information processing apparatus according to claim 9, wherein
the exclusion is managed for each of users.

13. The information processing apparatus according to claim 10, wherein
the exclusion is managed for each of users.

14. The information processing apparatus according to claim 1, wherein the processor is configured to, if a notification about a change to the first information is received, transfer the notification about the change to the information terminal that satisfies the predetermined condition.

15. An information processing system comprising:

a plurality of information terminals, each of which includes a first processor, the first processor displaying, in a case where a request to display information regarding a file to be output from a corresponding information terminal is received from a user, first information, which is used to identify the file, stored in the corresponding information terminal without performing communication for requesting obtaining of the first information, if the first information is already stored in the corresponding information terminal; and an information processing apparatus including a second processor, the second processor receiving, from an external apparatus, a request to output the file, identifying, in cooperation with the external apparatus, an information terminal that satisfies a predetermined condition among a plurality of information terminals that are candidates for a target to which the file is to be output, and transmitting the first information to the identified information terminal before the user requests the identified information terminal to display information regarding the file, wherein the predetermined condition is that a number of file requests by the identified information terminal exceeds a predetermined threshold.

16. An information processing apparatus comprising:

means for receiving, from an external apparatus, a request to output a file to be output by an information terminal, means for identifying, in cooperation with the external apparatus, an information terminal that satisfies a predetermined condition among a plurality of information terminals that are candidates for a target to which the file is to be output, and means for transmitting, to the identified information terminal, first information to be used to identify the file before a user requests the identified information terminal to display information regarding the file, wherein the predetermined condition is that a number of file requests by the identified information terminal exceeds a predetermined threshold.

* * * * *